US012636887B2

(12) United States Patent
Tsutsumi et al.

(10) Patent No.: US 12,636,887 B2
(45) Date of Patent: May 26, 2026

(54) LIQUID EJECTION DEVICE

(71) Applicant: KYOCERA CORPORATION, Kyoto (JP)

(72) Inventors: Takuya Tsutsumi, Kirishima (JP); Ryota Imanishi, Kirishima (JP); Tatsumi Uwai, Kirishima (JP); Masaya Kimachi, Kirishima (JP); Taku Sato, Izumi (JP); Hiroyuki Sugimoto, Kirishima (JP)

(73) Assignee: KYOCERA CORPORATION, Kyoto (JP)

( * ) Notice: Subject to any disclaimer, the term of this patent is extended or adjusted under 35 U.S.C. 154(b) by 141 days.

(21) Appl. No.: 18/580,610

(22) PCT Filed: Jul. 15, 2022

(86) PCT No.: PCT/JP2022/027837
§ 371 (c)(1),
(2) Date: Jan. 19, 2024

(87) PCT Pub. No.: WO2023/002940
PCT Pub. Date: Jan. 26, 2023

(65) Prior Publication Data

US 2025/0074063 A1 Mar. 6, 2025

(30) Foreign Application Priority Data

Jul. 21, 2021 (JP) ................................ 2021-120736

(51) Int. Cl.
*B41J 2/165* (2006.01)

(52) U.S. Cl.
CPC .. *B41J 2/16552* (2013.01); *B41J 2002/16558* (2013.01); *B41P 2235/20* (2013.01)

(58) Field of Classification Search
CPC .......... B41J 2/16552; B41J 2002/16558; B41J 2/16535; B41P 2235/20
See application file for complete search history.

(56) References Cited

U.S. PATENT DOCUMENTS

2012/0050403 A1* 3/2012 Inoue .................. B41J 2/16585 347/33

FOREIGN PATENT DOCUMENTS

| | | | | |
|---|---|---|---|---|
| CN | 111907219 A | * 11/2020 | .......... | B41J 2/16544 |
| CN | 115674908 A | * 2/2023 | .......... | B41J 2/16523 |
| JP | 2012051142 A | 3/2012 | | |
| JP | 2021016954 A | 2/2021 | | |

* cited by examiner

*Primary Examiner* — Sharon Polk
(74) *Attorney, Agent, or Firm* — HAUPTMAN HAM, LLP

(57) ABSTRACT

A liquid ejection device includes a liquid ejection head, a standby portion, a hold portion, and an operation portion. The liquid ejection head includes a nozzle surface. The standby portion supports a wiping cartridge. The hold portion holds the wiping cartridge. The operation portion moves the hold portion relatively to the standby portion and the liquid ejection head from a position at which the hold portion holds the wiping cartridge that is not held by the hold portion and that is supported by the standby portion to a position at which the wiping cartridge held by the hold portion comes into contact with the nozzle surface.

16 Claims, 14 Drawing Sheets

LIQUID EJECTION DEVICE

RELATED APPLICATIONS

The present application is a National Phase of International Application Number PCT/JP2022/027837 filed Jul. 15, 2022, which claims the benefit of priority from Japanese Patent Application No. 2021-120736, filed on Jul. 21, 2021.

TECHNICAL FIELD

The present disclosure relates to a liquid ejection device such as an inkjet printer.

BACKGROUND OF INVENTION

A known liquid ejection head (for example, an inkjet head) ejects droplets (for example, ink droplets) toward a recording medium (for example, a sheet of paper). Such a liquid ejection head includes, for example, a nozzle surface in which multiple nozzles through which droplets are ejected are open. This nozzle surface is wiped by a known technology (refer to, for example, Patent Literature 1 below). Wiping removes, for example, a fixed adhering ink accumulating on the nozzle surface. The fixed adhering ink is generated, for example, as a result of part of ejected ink droplets floating in a mist form and adhering to and fixed on the nozzle surface. Removing the fixed adhering ink, for example, reduces a probability that a portion or entirety of each of the multiple nozzles is clogged with the fixed adhering ink. Eventually, ejection characteristics of the liquid ejection head are stabilized.

Patent Literature 1 discloses a wipe unit for wiping. The wipe unit includes a sheet-shaped ink absorber: a delivery rotor around which the ink absorber is wound; and a winding rotor that winds the ink absorber delivered from the delivery rotor. The ink absorber includes a portion between the delivery rotor and the winding rotor. Wiping is performed with the portion. The ink absorber moves from the delivery rotor toward the winding rotor by a predetermined amount after wiping and thereby performs next wiping with an unused portion of the ink absorber. After almost all of the ink absorber wound around the delivery rotor is used, a user replaces the wipe unit.

CITATION LIST

Patent Literature

Patent Literature 1: Japanese Unexamined Patent Application Publication No. 2012-51142

SUMMARY

A liquid ejection device according to one aspect of the present disclosure includes a liquid ejection head, a standby portion, a hold portion, and an operation portion. The liquid ejection head includes a nozzle surface. The standby portion supports a wiping cartridge. The hold portion holds the wiping cartridge. The operation portion moves the hold portion relatively to the standby portion and the liquid ejection head from a first position to a second position. The first position is a position at which the hold portion holds the wiping cartridge that is not held by the hold portion and that is supported by the standby portion. The second position is a position at which the wiping cartridge held by the hold portion comes into contact with the nozzle surface.

DESCRIPTION OF EMBODIMENTS

Figure 1:
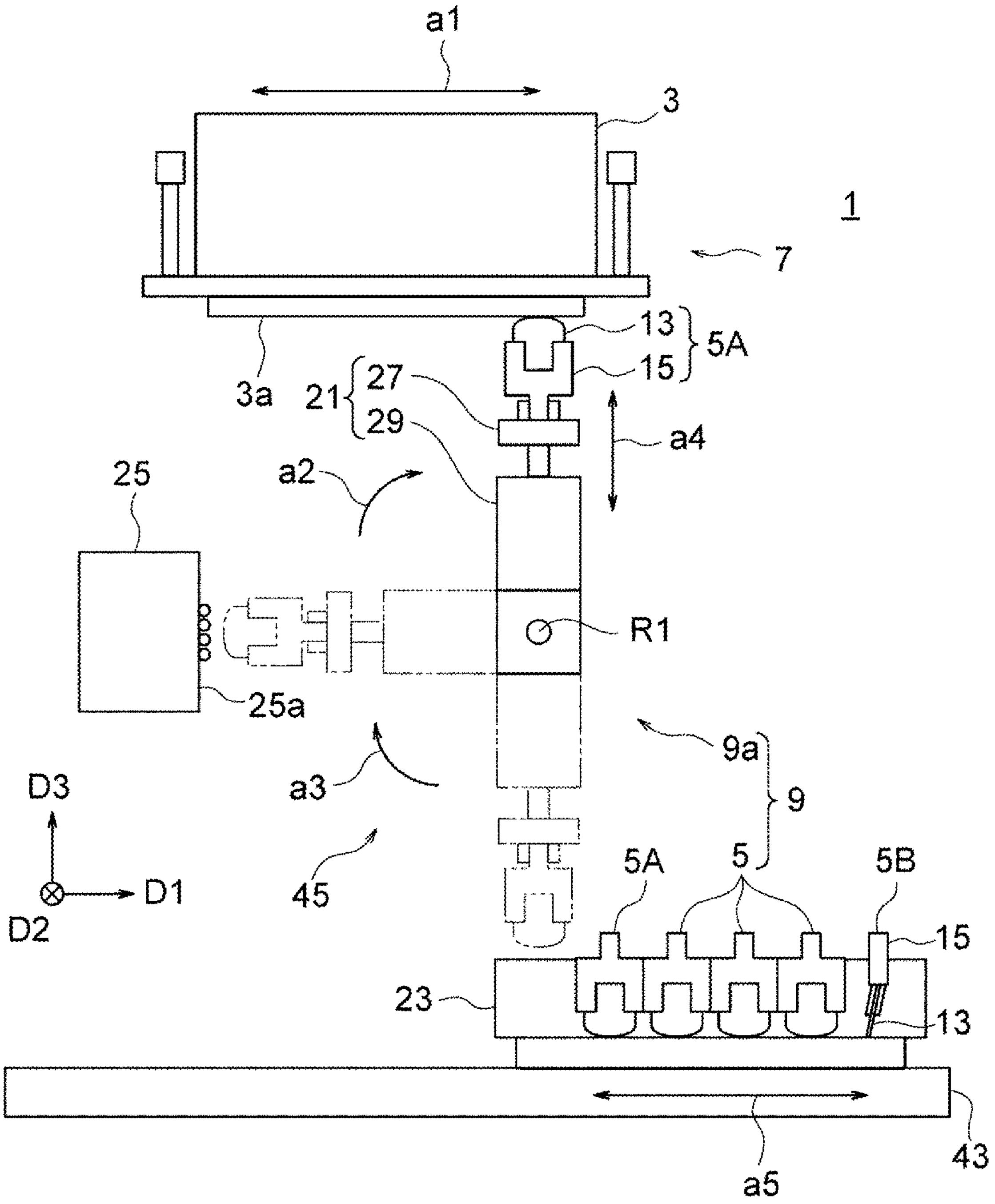
FIG. 1 is a schematic view illustrating a configuration of a principal portion of a liquid ejection device according to a first embodiment.

Hereinafter, embodiments of the present disclosure will be described with reference to the drawings. Note that the drawings used in the following description are schematic, and dimensional ratios and the like in the drawings do not necessarily coincide with actual ones. The dimensional ratios and the like do not necessarily coincide with each other also among the drawings. A specific shape may be exaggerated, or details may be omitted.

After description of a first embodiment, basically, differences from previously described embodiments (or alternative embodiments and the like) are described in description of other embodiments (or alternative embodiments and the like). Matters not particularly mentioned may be considered the same as and/or similar to those in previously described embodiments and the like and may be analogized from previously described embodiments and the like. Signs in the first embodiment may be used in description of alternative embodiments and the like for convenience. Note that various alternative embodiments and the like may be applied to other embodiments.

First Embodiment (Outline Of Liquid Ejection Device)

FIG. 1 is a schematic view illustrating a configuration of a principal portion of a liquid ejection device 1 (hereinafter may be referred to as the "device 1") according to the first embodiment.

The drawings include an orthogonal coordinate system D1-D2-D3. The device 1 may be used in any direction with respect to a vertical direction. For convenience, the following description may include expressions on an assumption that the +D3 side is the upper side in the vertical direction.

The device 1 is, for example, an inkjet printer. Note that the following description may include expressions on an assumption that the device 1 is a printer. For example, the printer ejects droplets (ink droplets) toward a recording medium (for example, a sheet of paper), which is not illustrated, from a nozzle surface 3*a* of a liquid ejection head 3 (hereinafter may be simply referred to as the "head 3"). Consequently, an image (including characters) is formed on the recording medium. In other words, recording and/or printing is performed.

The device 1 wipes the nozzle surface 3*a* with a wiping cartridge 5 (5A and 5B). Note that hereinafter the "wiping cartridge" may be simply referred to as the "cartridge". FIG. 1 illustrates a state in which wiping is performed. When printing is performed with the head 3, the head 3 and the cartridge 5 are disposed away from each other, differently from those in FIG. 1.

As described in BACKGROUND OF INVENTION, wiping the nozzle surface 3*a*, for example, removes a fixed adhering ink and stabilizes ejection characteristics of the head 3. When a liquid ejected through the head 3 is not an ink, for example, a fixed adhering liquid and/or dust that is separate from the liquid is removed, and the ejection characteristics of the head 3 are stabilized.

The device 1 includes a device body 7 that ejects a liquid and a wiper 9 that performs wiping. The device body 7 includes, for example, the head 3. The device body 7 is responsible for a relative movement of the head 3 and a recording medium, control of the head 3, and the like. In FIG. 1, the device body 7, except the head 3, is not illustrated. The wiper 9 includes a cartridge 5 and is responsible, for example, for a relative movement of the cartridge 5 and the head 3.

Note that the device body 7 and the wiper 9 may include a portion that is shared therebetween and may be not necessarily distinguished from each other clearly. As described later, the cartridge 5 can be considered as a consumable item. The device 1 and the wiper 9 thus may be each defined with the cartridge 5 excluded. Hereinafter, a portion of the wiper 9 excluding the cartridge 5 may be referred to as a wiper body 9*a* for convenience.

The wiper body 9*a* includes, for example, following components: an arm 21 holding the cartridge 5 currently used for wiping while the wiping is performed: a standby portion 23 as a place at which at least one cartridge 5 (a cartridge 5 for replacement) that is not used by the arm 21 is on standby; and an applicator 25 that applies a cleaning liquid with which the nozzle surface 3*a* is cleaned to the cartridge 5. The arm 21 includes, for example, following components: a hold portion 27 that can hold the cartridge 5 and cancel the holding (release the cartridge 5); and an arm body 29 that moves the hold portion 27.

The wiper 9 replaces, by itself (that is, without manual work of a user), the cartridge 5 held by the hold portion 27. Consequently, convenience of a user improves. Note that replacement includes releasing of the cartridge 5 by the hold portion 27 and holding of a new cartridge 5 by the hold portion 27. Note that the wiper 9 may perform only one of releasing and holding by itself, and only one of releasing and holding in replacement may be focused as a feature. In description of embodiments, replacement, holding, or releasing may be focused and described without any particular notice.

Except for a configuration relating to replacement of the cartridge 5, configurations of the device 1 may be various configurations and may be, for example, publicly known configurations. For example, the configurations of the device body 7 except for a portion for cooperating with the wiper 9 can be considered to be the same as and/or similar to publicly known configurations. Description of portions that can be considered as such publicly known configurations is omitted, as appropriate.

Basically, the first embodiment will be described in the followings order.

Figure 2:
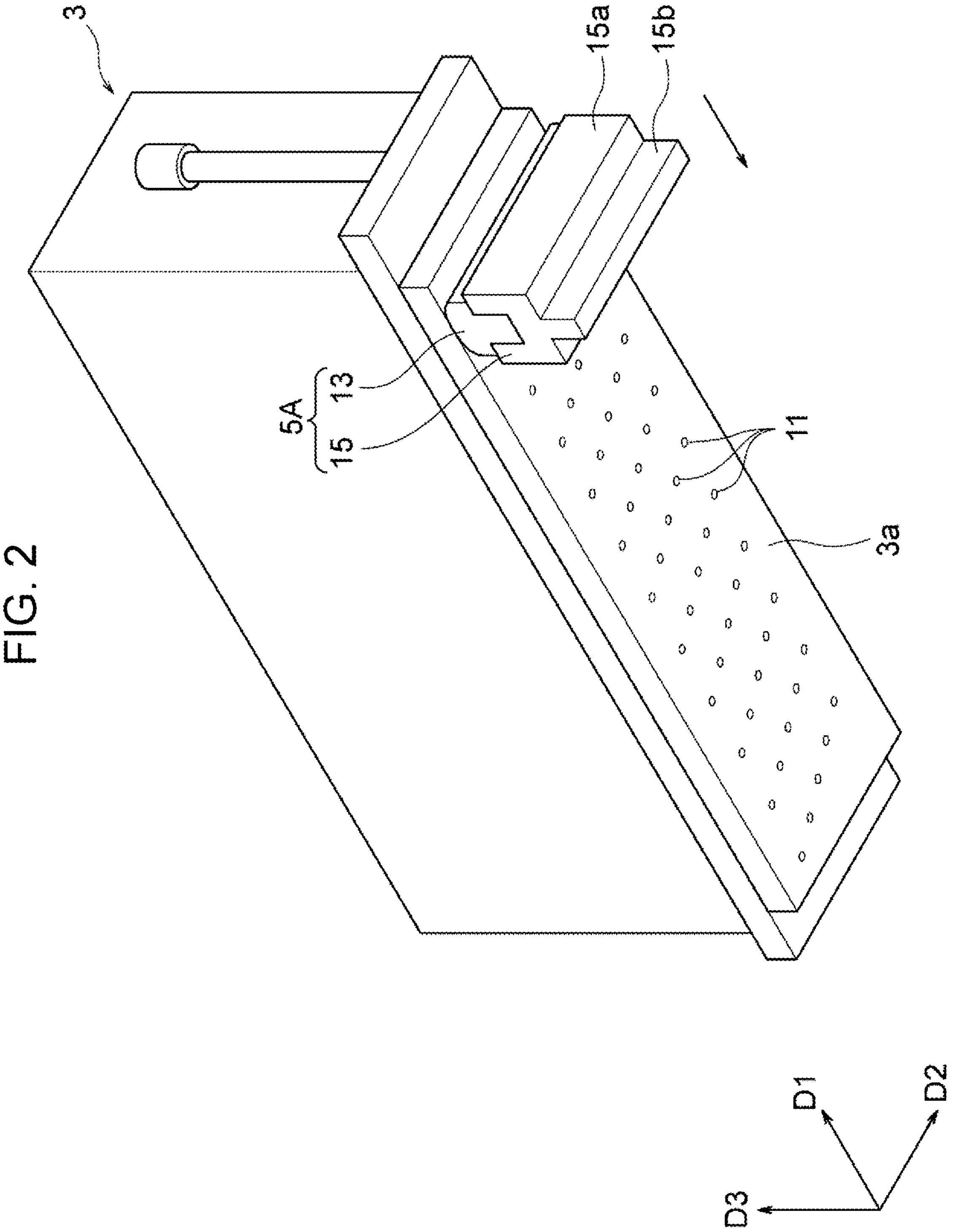
FIG. 2 is a perspective view schematically illustrating a liquid ejection head and a wiping cartridge of the liquid ejection device in FIG. 1.

(1) Head 3 (FIG. 2)

(2) Outline Of Configuration And Operation Relating To Wiping (FIG. 1 and FIG. 2)

(3) Cartridge 5 (FIG. 1 and FIG. 2)

Figure 3:
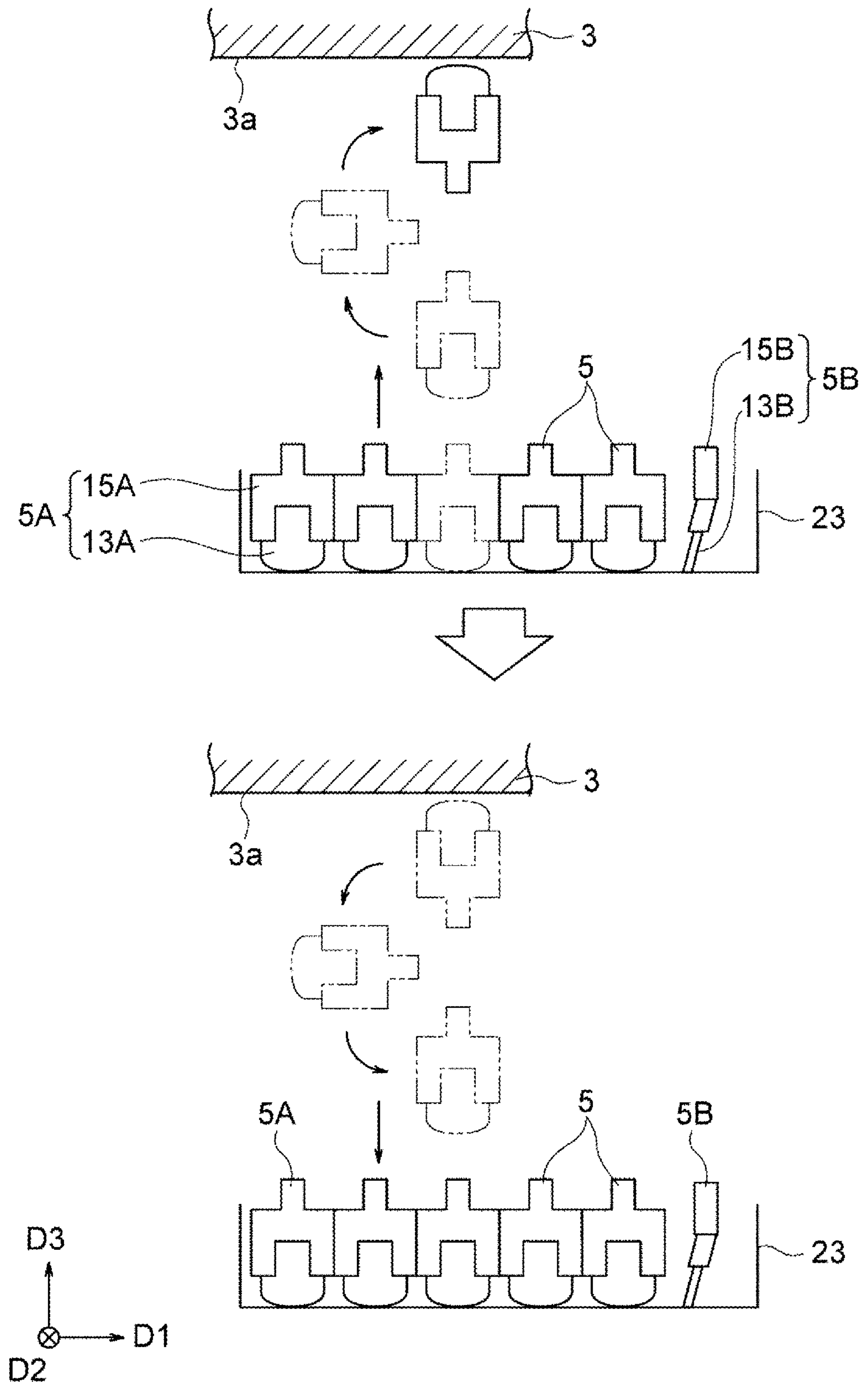
FIG. 3 is a schematic view describing an operation relating to replacement of a wiping cartridge.

(4) Outline Of Configuration And Operation Relating To Replacement Of Cartridge 5 (FIG. 1 and FIG. 3)

(5) Configuration And Operation Relating To Replacement Of Cartridge 5 in First Embodiment (FIG. 1)

(6) Configuration And Operation Relating To Supply Of Cleaning Liquid In First Embodiment (FIG. 1)

Figure 4:
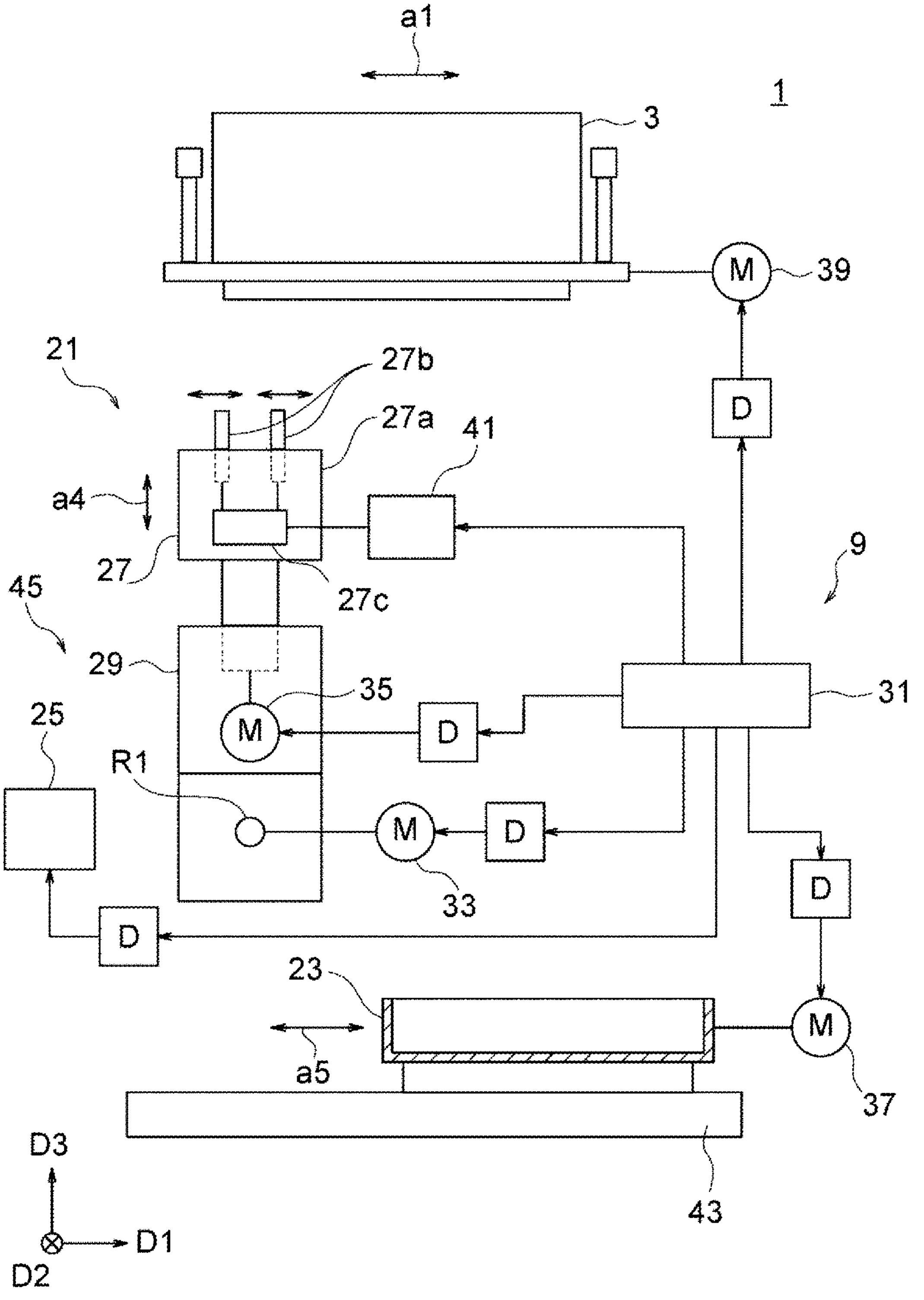
FIG. 4 is a block diagram schematically illustrating a configuration of a control system of the liquid ejection device in FIG. 1.

(7) Specific Example Of Hold Portion 27 (FIG. 1 and FIG. 4)

(8) Specific Example Of Arm 21 (FIG. 1 and FIG. 4)

(9) Specific Example Of Standby Portion 23 (FIG. 1 and FIG. 4)

(10) Specific Example Of Applicator 25 (FIG. 1 and FIG. 4)

(11) Control System Of Wiper 9 (FIG. 4)

(12) Summary Of First Embodiment

In the description of (1) and (2) above, portions that can be various configurations including publicly known configurations will be mainly described. Note that the description of (1) and (2) above may include description relating to new configurations without any notice. In the description of (2) above, basically, configurations and operations of wiping itself except for a configuration and an operation relating to replacement of the cartridge 5 will be described. In the description of (3) above, reasons for replacement and the like will be mentioned in addition to configurations of the cartridge 5. In the description of (4) above, mainly, matters that are common between later-described second and third embodiments will be described.

(Head)

FIG. 2 is a perspective view schematically illustrating the head 3. In FIG. 2, a state in which wiping is performed is illustrated, and the cartridge 5 (5A) is illustrated in addition to the head 3.

The head 3 can include a publicly known configuration. Accordingly, details of the head 3 may be omitted, as appropriate, in the following description. The description of the head 3 may include expressions on assumption that the cartridge 5 is disposed away from the head 3, differently from FIG. 1 and FIG. 2.

The head 3 is a device that ejects droplets toward the −D3 side. The droplets are, for example, ink droplets. In this case, ejected ink droplets, for example, adhere to an object (for example, a recording medium), which is not illustrated, disposed on the −D3 side with respect to the head 3. Consequently, printing or the like with respect to the object is performed.

The head 3 includes the nozzle surface 3*a* facing the −D3 side. The nozzle surface 3*a* includes one or more (multiple in the illustrated example) nozzles 11 (FIG. 2) through which droplets are ejected. Note that the wording "nozzle surface 3*a*" can be considered to indicate the entirety of a surface of the head 3 on the −D3 side and can be considered to indicate only, in the surface on the −D3 side, a region in which the multiple nozzles 11 are disposed.

The nozzle surface 3*a* is, for example, a flat surface. In some applications of the head 3, however, the nozzle surface 3*a* may be a curved surface or the like. The planar shape of the nozzle surface 3*a* is optional. In the illustrated example, the nozzle surface 3*a* is elongated in the D1 direction. More specifically, the nozzle surface 3*a* has a substantially rectangular shape whose longitudinal direction is the D1 direction. Dimensions of the nozzle surface 3*a* are optional. For example, the length in the D1 direction may be not less than 1 cm and not more than 1 m and may be outside this range. For example, the length (the width of the nozzle surface 3*a*) in the D2 direction may be not less than 1 mm and not more than 20 cm and may be outside of this range. The material of the nozzle surface 3*a* may be, for example, a metal or a resin. The metal or the resin may be covered with a water-repellent film.

The shape and the dimensions of each of the nozzles 11 are optional. The number and the arrangement of the multiple nozzles 11 are also optional For example, the multiple nozzles 11 are arranged in one or more (multiple (five) in the illustrated example) rows. The direction (the arrangement direction of the nozzles 11 in each of the rows) in which the rows extend are, for example, the D1 direction (in another point of view, a longitudinal direction of the nozzle surface 3*a*). The direction in which the rows extend may be parallel (the illustrated example) or inclined with respect to the D1 direction.

Ink droplets are ejected through the multiple nozzles 11 while the head 3 and a recording medium are relatively moved in a direction (for example, the D2 direction) intersecting the rows of the multiple nozzles 11. A belt-shaped image having a width in the direction in which the rows extend is thereby formed. When viewed in a direction (for example, the D2 direction) of the relative movement of the head 3 and the recording medium, the nozzles 11 are disposed such that the positions of the nozzles 11 in one of the rows do not overlap the positions of the nozzles 11 in another one of the rows. Consequently, dots can be formed on the recording medium at a pitch narrower than a pitch of the nozzles 11 in each of the rows.

A method relating to ejection at the head 3 is optional and may be, for example, a piezoelectric method or a thermal method. In the head of a piezoelectric method, a piezoelectric body applies a pressure to a liquid, and droplets are thereby ejected through the nozzles 11. In the head of a thermal method, the heat of a heating body forms air bubbles in a liquid, and droplets are ejected through the nozzles 11 by a pressure generated due to the formation of the air bubbles.

For example, the head 3 may be used in a so-called line printer and may be used in a serial printer.

The head 3 that is to be used in a line printer has a length substantially corresponding to the entire length (width) of a recording medium in the D1 direction. The head 3 ejects ink droplets while moving in the D2 direction relatively to the recording medium. Consequently, for example, an image is formed over almost entirety of the recording medium. Multiple heads 3 may be arranged as a unit that functions as a head of a line printer. One example of this form will be presented later.

The head 3 that is to be used in a serial printer repeats an operation of forming a belt-like image by ejecting ink droplets while moving in the D2 direction relatively to a recording medium and an operation of moving in the D1 direction relatively to the recording medium. Consequently, multiple belt-like images are formed to be continuous with each other. Eventually, an image is formed over almost entirety of the recording medium.

The liquid to be ejected by the head 3 may be, for example, an ink. The ink contains, for example, a colorant and a solvent. The colorant may be, for example, a pigment or a dye. The solvent may be, for example, water or an organic solvent. While an ink and a paint are distinguished from each other in some technical fields, the two are not distinguished from each other in the description of embodiments.

The liquid to be ejected by the head 3 may be a liquid other than an ink. For example, the liquid may be a coating agent containing no colorant. The liquid may be printed on a circuit board and form an electrically conductive layer. The liquid may be a liquid chemical agent or a liquid containing a chemical agent.

(Outline of Configuration and Operation Relating to Wiping)

Figure 14:
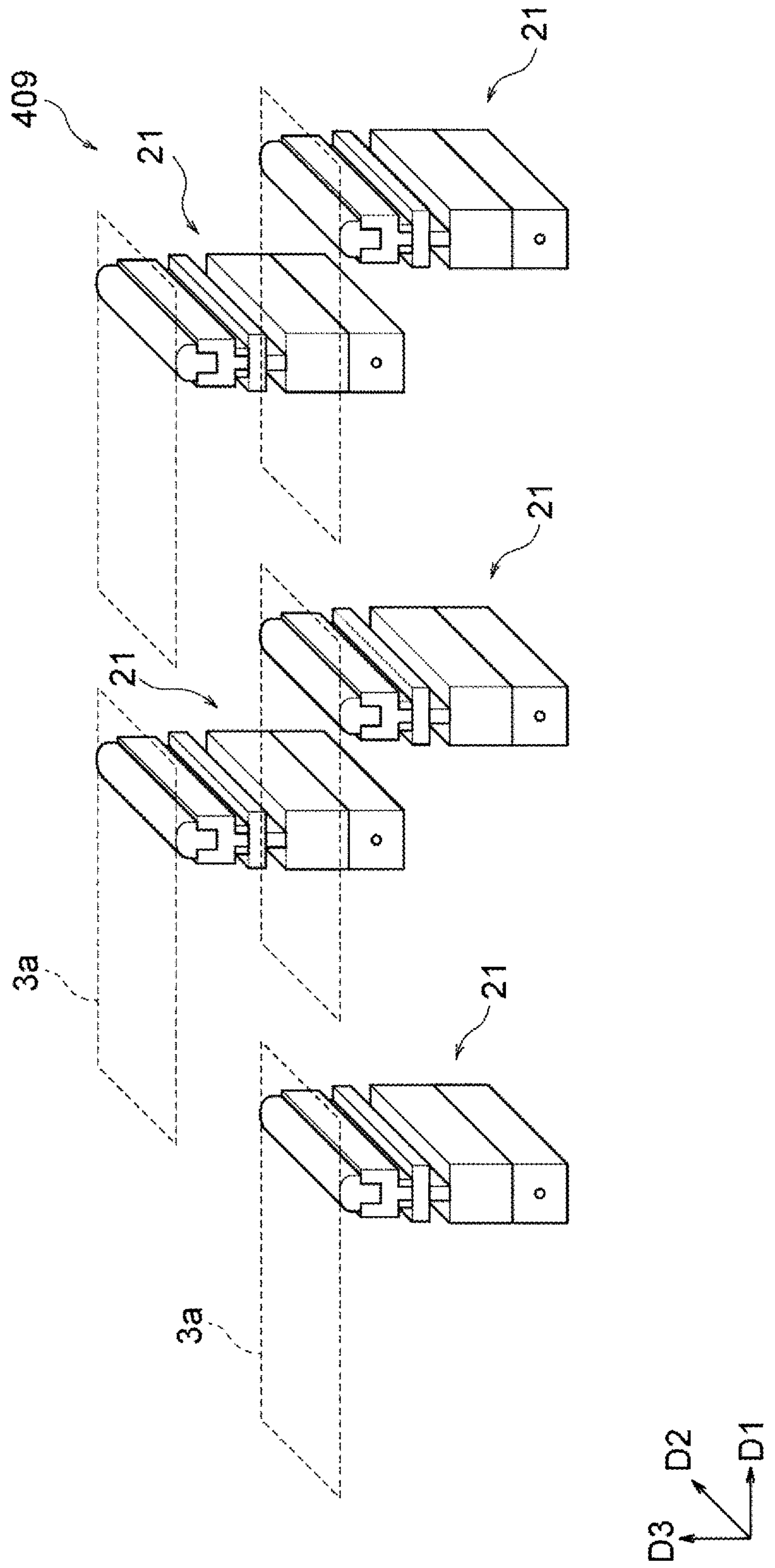
FIG. 14 is a perspective view illustrating an example of a configuration of a wiper used in the liquid ejection device in FIG. 12.

As described previously, the device 1 (FIG. 1) may include only one head 3 and may have multiple heads 3. In the latter case, the wiper 9 may wipe the multiple heads 3. In the description of embodiments, basically, one head 3 will be focused and described. An example including multiple heads 3 will be described later (FIG. 14). The description of wiping itself (an operation excluding replacement of the cartridge 5) is based on that the cartridge 5 is held by the arm 21 (more specifically, the hold portion 27) unless otherwise specified.

As illustrated in FIG. 1, the hold portion 27 holds the cartridge 5. The number of cartridges 5 simultaneously held by the hold portion 27 is, for example, one. In a state in which the cartridge 5 held by the hold portion 27 is in contact with the nozzle surface 3*a*, the head 3 and the hold portion 27 relatively move in a direction (the D1 direction in the illustrated example) along the nozzle surface 3*a*. The cartridge 5 is thereby slid with respect to the nozzle surface 3*a*. Consequently, wiping is performed.

Forms of the contact and the movement of the cartridge 5 with respect to the nozzle surface 3*a* in wiping may be any appropriate forms. In the example in FIG. 1 and FIG. 2, the cartridge 5 is in contact with the nozzle surface 3*a* over the entire length of the nozzle surface 3*a* in the D2 direction. As indicated by arrows, the cartridge 5 moves in the D1 direction relatively to the nozzle surface 3*a*. Consequently, almost entirety of the nozzle surface 3*a* is wiped.

The cartridge 5 may perform a relative movement toward the +D1 side, a relative movement toward the −D1 side, or these two relative movements with respect to the nozzle surface 3*a* and perform wiping. Note that a relative movement toward either one of the sides may be presented as an example in the following description without any notice. In this case, a relative movement toward the other side may be performed in a manner that is the same as and/or similar to the manner for the relative movement toward the one side. In the following description, a view of the movement toward the −D1 side and a view of the movement toward the +D1 side may be described as views that indicate the same state.

Differently from the illustrated example, the cartridge 5 may perform a relative movement in a direction other than the D1 direction with respect to the nozzle surface 3*a* and perform wiping. Examples of such a direction is the D2 direction and a direction inclined with respect to the D1 direction. The cartridge 5 may, instead of moving linearly, move in an arc shape (more generically, a curved shape) like a wiper of a vehicle relatively to the nozzle surface 3*a*. The cartridge 5 may change the direction of the relative movement with respect to the nozzle surface 3*a* to various directions.

Differently from the illustrated example, the cartridge 5 does not necessary have a length corresponding a length of the nozzle surface 3*a* in a direction (the D2 direction in the illustrated example) orthogonal to the direction of the relative movement with respect to the nozzle surface 3*a* in plan view of the nozzle surface 3*a*. In this case, the cartridge 5 may wipe the entirety of the nozzle surface 3*a* by reciprocating while varying the position thereof in the aforementioned orthogonal direction with respect to the nozzle surface 3*a*. Alternatively, two or more cartridges 5 may be used for one head 3.

A relative movement of the head 3 and the hold portion 27 in wiping may be realized by a movement of the head 3, a movement of the hold portion 27, or movements of both the head 3 and the hold portion 27. A specific form of a configuration responsible for the movements may be optional. Note that the description of the present embodiment includes description based on a form in which the head 3 moves as indicated by the arrow a1 in FIG. 1.

The head 3 shifts between, for example, a state of facing a recording medium (in another point of view, a transport portion, which is not illustrated, that transports the recording medium) and a state of facing the wiper 9. This state shift may be realized by a movement of the head 3 and may be realized by a movement of the transport portion and a movement of the wiper 9. The aforementioned movement of the wiper 9 may be a movement of the entirety (the arm 21, the standby portion 23, a bed 43 (described later), and the applicator 25) of the wiper 9 and may be a movement of a portion (for example, the arm 21) of the wiper 9. A configuration responsible for the movements in wiping in previous paragraphs may include at least a portion shared with at least a portion of a configuration responsible for the movements in the aforementioned state shift. These configurations may be totally separated from each other.

Wiping may be performed at an appropriate time. For example, wiping may be performed when a predetermined operation is performed on an operation unit (not illustrated) included in the device 1. Wiping may be performed when a controller 31 (FIG. 4) included in the device 1 determines that a time to perform wiping has come. The time may be, for example, a time when the device 1 is operated, a time when printing is started after the operation, and/or a time when the printing has been performed for a predetermined length of time. The controller 31 may determine whether to perform wiping on the basis of information on a state (for example, soil) of the nozzle surface 3*a*. Information on the nozzle surface 3*a* may be obtained, for example, by an imager that images the nozzle surface 3*a* or by a scanner that scans a printed image (necessity of wiping can be determined when image quality is degraded).

(Cartridge)

As described previously, the wiper 9 replaces the cartridge 5 by itself. Therefore, at least at a time when replacement is performed, the wiper 9 includes at least two cartridges 5 (a cartridge to be replaced and a cartridge that replaces the cartridge to be replaced). The number of cartridges 5 simultaneously included in the wiper 9 may be set as appropriate. In FIG. 1, one cartridge 5 that is currently used (that is held by the hold portion 27) and five cartridges 5 (5A and 5B) that are not used (that are disposed at the standby portion 23) are illustrated. Each of the five cartridges 5 that are not used is, for example, a used cartridge or an unused cartridge. The used cartridge 5 may be reused.

The cartridge 5 may be replaced on the basis of an appropriate reason. For example, replacement may be replacement of a cartridge 5, which is soiled by being used in wiping, with an unused cartridge 5. In this case, a configuration of the cartridge 5 to be replaced and a configuration of the cartridge 5 that replaces the cartridge 5 to be replaced are, for example, identical to each other. Thus replaced cartridge may be disposable and may be cleaned and reusable. Replacement may be, for example, replacement between cartridges 5 whose configurations differ from each other. In this case, for example, a cartridge 5 having a configuration that is suitable for a state (the degree of soil and/or types of adhering substances) of soil on the nozzle surface 3*a* can be used. Note that replacement corresponding to both of the aforementioned two types of replacement may be performed.

As understood from the above description, the multiple cartridges 5 included in the wiper 9 may have configurations that are identical to each other or configurations that differ from each other. In other words, the multiple cartridges 5 may include only cartridges 5 of one type and may include cartridges 5 of two or more types. In the latter case, the number of cartridges 5 of one type and the number of cartridges of another type (in another point of view, the ratio of the numbers of different types of the cartridges 5) may be optional. FIG. 1 illustrates a form in which multiple (six) cartridges 5 include cartridges 5 (5A and 5B) of two types. More specifically, the multiple cartridges 5 include five first cartridges 5A and one second cartridge 5B in FIG. 1.

For example, the multiple first cartridges 5A have configurations identical to each other. After used, each of the first cartridges 5A is replaced with an unused one of the first cartridges 5A. For example, compared with the second cartridge 5B, each of the first cartridges 5A has a configuration in which soil easily adheres thereto and/or has a configuration in which use frequency is set to be high. For such a reason, compared with the second cartridge 5B, each of the first cartridges 5A is highly frequently required to be replaced with an unused one of the first cartridges 5A. The number of the first cartridges 5A is thus larger than the number of the second cartridges 5B.

While no particular illustration is provided, the numbers of the cartridges 5 whose types are different from each other may be identical to each other, differently from the illustrated example. For example, the number of the first cartridges 5A and the number of the second cartridges 5B may be both one and may be both a predetermined number that is two or more. When three or more types of the cartridges 5 are disposed, such a relationship of the numbers may be established among all of the types and may be established among some of the types. The number of the cartridges 5 (5B in the illustrated example) of a type to which a relatively small number of the cartridges 5 belong may be two or more.

Each cartridge 5 includes, for example, a wipe member 13 that comes into contact with the nozzle surface 3*a* and that is directly responsible for wiping, and a holder 15 holding the wipe member 13. The holder 15 is held by the hold portion 27 of the arm 21. Note that each cartridge 5 may include only the wipe member 13. In other words, the hold portion 27 may hold the wipe member 13 directly.

Specific configurations (materials, shapes, dimensions, and the like) of the wipe member 13 and the holder 15 are optional. For example, a material of the wipe member 13 may have or have no elasticity and/or liquid retaining ability. The wipe member 13 may be integrally made with one material and may include two or more members made of materials that differ from each other.

Specific configurations of the wipe member 13 and the holder 15 will be described with the first cartridge 5A and the second cartridge 5B presented as examples. Note that the sign A may be given in the following description to the wipe member 13 and the holder 15 of the first cartridge 5A (refer to FIG. 3). The sign B may be given to the wipe member 13 and the holder 15 of the second cartridge 5B.

The wipe member 13A of the first cartridges 5A has, for example, liquid retaining ability. For example, the entirety of the wipe member 13A may include a porous body. For example, as illustrated in later-described FIG. 11, the wipe member 13A may include an elastic member 13*a* and a liquid retention member 13*b* covering at least a portion of the elastic member 13*a*. The liquid retention member 13*b* may include a porous body or a cloth. An example of the porous body is a sponge.

When, as described above, a sponge is included in at least a surface-side portion of the wipe member 13A or when the wipe member 13A includes the elastic member 13*a*, the wipe member 13A has elasticity in addition to liquid retaining ability. The wipe member 13A, however, may have no elasticity. For example, differently from the above description, a hard material may be used as an alternative to the elastic member 13*a*, and the liquid retention member 13*b* that includes a cloth may be disposed on a surface of the hard material.

For example, in a state (hereinafter, the same applies in this paragraph) of not receiving a pressure from the nozzle surface 3*a*, the wipe member 13A has a curved end surface protruding toward the nozzle surface 3*a*. In another point of view, a distal end portion of the wipe member 13A has a shape of a semi-cylinder. The axis of the semi-cylinder is, for example, parallel to the nozzle surface 3*a* and parallel to a direction (the D2 direction) intersecting (for example, orthogonal to) a movement direction (the D1 direction) of wiping. Note that the semi-cylinder may be not a strict semi-cylinder and may be, for example, an elliptic semi-cylinder, may be flat, and may have an arc having an interior angle that is not 180° in sectional view. Differently from the illustrated example, the wipe member 13A may have a blade-like shape like a wipe member 13B (described later).

The holder 15A of the first cartridge 5A includes a hard material such as a metal, a resin, a ceramic material, or the like. As illustrated with signs in FIG. 2, the holder 15A includes, for example, a main portion 15*a* and a grip portion 15*b*. The main portion 15*a*, for example, contributes to holding of the wipe member 13A. The grip portion 15*b* is, for example, one example of a portion (held portion) that is to be held by the hold portion 27. The main portion 15*a* and the grip portion 15*b* are positioned closer than a portion (the distal end portion of the wipe member 13A) of the first cartridges 5A coming into contact with the nozzle surface 3*a* to a rear end portion of the first cartridges 5A. The grip portion 15*b* (including the rear end of the holder 15A in the illustrated example) is positioned closer than the main portion 15*a* to the rear end portion.

The main portion 15*a* may hold the wipe member 13A, as appropriate. For example, as illustrated in later-described FIG. 11, the holder 15A may include two members (signs are omitted) divided from each other in the direction (the D1 direction) of wiping. The two members may pinch the wipe member 13A therebetween and be fixed to each other, thereby holding the wipe member 13A. A screw or the like that is inserted into the wipe member 13A and fixed to the holder 15A may be disposed. The main portion 15*a* may have a length equal to the length of the wipe member 13 in the D2 direction. Note that the grip portion 15*b* may contribute to holding of the wipe member 13A while the grip portion 15*b* does not contribute thereto in the illustrated example.

The grip portion 15*b* has a smaller width than the main portion 15*a*, for example, in a predetermined direction (the D1 direction in the illustrated example) orthogonal to a direction from the distal end portion toward the rear end portion. Accordingly, for example, when the first cartridges 5A are arranged as illustrated in FIG. 1 at the standby portion 23 in the D1 direction, the grip portions 15*b* protrude upward to be spaced apart from each other. Consequently, the first cartridges 5A are each gripped from above easily. In the illustrated example, each of the grip portions 15*b* has a width that is equal to the width of the main portion 15*a* (and the wipe member 13) in the D2 direction. However, each grip portion 15*b* may be smaller than the main portion 15*a* also in the D2 direction. Note that, differently from the illustrated example, the grip portion 15*b* may be not included. The holder 15A may include a flange that is disposed closer than the grip portion 15*b* to the rear end portion and that has a width larger than a width of the grip portion 15*b* and smaller than a width of the main portion 15*a*.

The entirety of the wipe member 13B of the second cartridge 5B includes, for example, an elastic member. The elastic member has, for example, no liquid retaining ability (for example, is not a porous body). The wipe member 13B has, for example, a blade-like shape. That is, the wipe member 13B is generally a plate-like member having a constant thickness. The planar shape of the wipe member 13B is substantially rectangular. In wiping, the wipe member 13B causes one long side to be parallel to a direction (the D2 direction) intersecting (for example, orthogonal to) the movement direction (the D1 direction) in the wiping, comes into contact at a portion close to the one long side with the nozzle surface 3*a*, and slides with respect to the nozzle surface 3*a*. Although a soil removing effect of such a second cartridge 5B is smaller than that of the first cartridges, the second cartridge 5B can perform multiple times of wiping without being replaced. Therefore, the second cartridge 5B can be used when, for example, the amount of soil on the nozzle surface 3*a* is small and the first cartridge 5A is not required to be used. The use of the second cartridge 5B can reduce the disposed amount of the first cartridges 5A. When a water-repellent film is formed on the nozzle surface 3*a*, the second cartridge 5B may be used for a purpose of reducing deterioration of the water-repellent film due to wiping.

A configuration of a holder 15B of the second cartridge 5B is, for example, basically the same as and/or similar to a configuration of the holder 15A except for a difference in a configuration of the wipe member 13. The description of the holder 15A may support the holder 15B, as appropriate. Although no particular signs are given, the holder 15B includes, for example, a main portion and a grip portion similarly to the wipe member 13A. The grip portion of the holder 15B has a configuration that is the same as and/or similar to a configuration of the grip portion 15*b* of the wipe member 13A. The main portion of the holder 15B has a relatively small width in the D1 direction, differently from the main portion 15*a* of the wipe member 13A.

The width of the main portion of the holder 15B may be, differently from the illustrated example, the same as the width of the main portion 15*a* of the wipe member 13A. In another point of view, all of the cartridges 5 may have the grip portions 15*b* identical to each other and may be identical to each other in terms of the maximum width (the maximum width of the main portion 15*a*) in the D1 direction (and the D2 direction). In this case, for example, all of the cartridges 5 can be easily treated uniformly. Differently from the above description and the illustrated example, the multiple cartridges 5 may differ from each other in terms of the configuration of the grip portion 15*b*.

A material of the wipe members 13A of the aforementioned first cartridges 5A and a material of the wipe member 13B of the second cartridge 5B differ from each other at least partially. That is, the multiple cartridges 5 include two types or more of the cartridges 5 that differ from each other in terms of the material of the wipe member 13. Note that the elastic member 13*a* and the liquid retention member 13*b* are both considered as wipe members in the description of the present embodiment when the wipe member 13A includes the elastic member 13*a* and the liquid retention member 13*b*. However, only the liquid retention member 13*b* that comes into direct contact with the nozzle surface 3*a* may be considered as a wipe member.

In the description of the present embodiment, the multiple first cartridges 5A are described to have configurations that are identical to each other. However, differently from the description of the present embodiment, the multiple first cartridges 5A may differ from each other in terms of the material (material quality) of the wipe member 13A and thus have configurations that differ from each other. In another point of view, the multiple cartridges 5 may include two or more types of the cartridges 5 that are the same in terms of the shape and the dimensions and that differ from each other in terms only the material quality.

(Outline of Configuration and Operation Relating to Replacement of Cartridge)

Regarding a configuration and an operation relating to replacement of the cartridges 5, matters that are common between the present embodiment and later-described second and third embodiments will be described here mainly.

Replacement of the cartridge 5 is realized by relatively moving the hold portion 27 of the arm 21 and the standby portion 23 and thereby moving the cartridge 5 at the standby portion 23 to a position at which the hold portion 27 can hold (or release) the cartridge 5. In another point of view, the replacement is not performed by carrying the cartridge 5 from the standby portion 23 to the hold portion 27 by a replacement device (for example, a robot), which is not illustrated, disposed separately from the arm 21 and the standby portion 23.

After replacement of the cartridge 5, the cartridge 5 held by the hold portion 27 is moved from the standby portion 23 by a relative movement of the hold portion 27 and the standby portion 23. Further, the cartridge 5 is moved by a relative movement of the hold portion 27 and the head 3 to a position at which the cartridge 5 comes into contact with the nozzle surface 3*a*. Consequently, wiping is enabled. Note that, as understood from later description, the position at which the cartridge 5 comes into contact with the nozzle surface 3*a* may denote a position at which the cartridge 5 can come into contact with the nozzle surface 3*a* (whether the cartridge 5 is currently in contact with the nozzle surface 3*a* at the position does not matter).

Replacement (or holding or releasing: hereinafter, the same applies) of the cartridge 5 may be performed at every time of wiping or may be performed after wiping is performed twice or more. In any case, the above-described movements, including a movement (first movement) in which the hold portion 27 moves to the position at which the hold portion 27 can hold the cartridge 5, a movement (second movement) in which the hold portion 27 newly holding the cartridge 5 moves away from the standby portion 23, and a movement (third movement) in which the cartridge 5 held by the hold portion 27 moves to a position at which the cartridge 5 comes into contact with the nozzle surface 3*a*, may be performed as a series of operations when replacement of the cartridge 5 and first wiping after the replacement are performed. Note that sentences and the drawings for description of embodiments may include, for convenience, expressions based on that such a series of operations is performed.

When wiping is performed twice or more after replacement, the hold portion 27 may be on standby, for the time of next wiping, at an appropriate position without returning after wiping to the position of the standby portion 23. The hold portion 27 may move when the time of next wiping has come to a position at which the cartridge 5 comes into contact with the nozzle surface 3*a*. That is, the aforementioned first and second movements are not necessarily performed after replacement in second and subsequent wiping. The above-described first to third movements may be not performed as a series of operations also in a form in which replacement is performed at every time of wiping. For example, another operation may be performed in an interval between the first to third movements. However, each of the aforementioned first to third movements is still performed once after replacement in any case.

As described previously, when wiping is performed in the device 1, a state in which the head 3 and a recording medium (in another point of view, the transport portion that transports the recording medium) face each other shifts to a state in which the head 3 and the wiper 9 face each other. In performing both of replacement of the cartridge 5 and wiping, relative time of the aforementioned state shift and the relative movements (the first to third movements) of the hold portion 27 to replace the cartridge 5 and the like may be set as appropriate.

For example, the relative movements (the first to third movements) of the hold portion 27 to replace the cartridge 5 and the like may be performed after the state in which the head 3 and a recording medium face each other shifts to the state in which the head 3 and the wiper 9 face each other. In this case, for example, the first to third movements may be performed as a series of operations, as described above. For convenience, expressions based on this form may be included in sentences and the drawings in description of embodiments.

For example, the aforementioned relative time may be set reversely. Specifically, the relative movements (the first to third movements) of the hold portion 27 to replace the cartridge 5 and the like may be performed first in the state in which the head 3 and a recording medium face each other. The third movement causes the cartridge 5 to reach a position at which the cartridge 5 can come into contact with the nozzle surface 3*a*. Thereafter, the state in which the head 3 and the recording medium face each other may shift to the state in which the head 3 and the wiper 9 face each other. At this time, the cartridge 5 held by the hold portion 27 may actually come into contact with the nozzle surface 3*a*.

For example, the state shift may be performed during a relative movement for replacement or the like, and a relative movement for replacement or the like may be performed during the state shift. For example, replacement (the first movement) of the cartridge 5 held by the hold portion 27 may be performed in the state in which the head 3 and a recording medium face each other. The cartridge 5 that is newly held by the hold portion 27 may remain at the standby portion 23 or stop at an intermediate position away from the standby portion 23. That is, the third movement may be not performed. Next, the state shift may be performed. Thereafter, the cartridge 5 held by the hold portion 27 may move (perform the third movement) from the standby portion 23 or the intermediate position toward the nozzle surface 3*a* and come into contact with the nozzle surface 3*a*.

For example, at least part of the relative movement for replacement and the like and at least part of the state shift may be integrated together (may be unified). Later-described second and third embodiments may be referred as an example of this.

The relative movements (the first and second movements) of the hold portion 27 and the standby portion 23 in replacement of the cartridge 5 may be realized by either of a movement of the hold portion 27 and a movement of the standby portion 23 or may be realized by the two movements. The relative movements (the third movement) of the hold portion 27 and the head 3 after replacement may be realized by either of a movement of the hold portion 27 and a movement of the standby portion 23 or may be realized by the two movements.

A mechanism that realizes relative movements (the first and second movements) of the arm 21 and the standby portion 23 in replacement of the cartridge 5 and a mechanism that realizes a relative movement (the third movement) of the arm 21 and the head 3 after replacement may share part or the entirety thereof or may be totally separate from each other. Part or the entirety of these mechanisms may be shared with part or the entirety of a mechanism that relatively moves the head 3 and the hold portion 27 to perform wiping or may be shared with part or the entirety of a mechanism that realizes the relative movement for the state shift.

FIG. 3 is a schematic view describing an operation relating to replacement of the cartridge 5.

As illustrated in the upper stage in FIG. 3 and as previously mentioned, the arm 21 picks up, from the multiple (a first number of) cartridges 5 supported by the standby portion 23, some of the cartridges 5 (the number of the cartridges 5 is less than the first number: one in the illustrated example). The wiper 9 uses the cartridge 5 that has been picked up for wiping. As illustrated in the lower stage in FIG. 3, the arm 21 returns the currently holding cartridge 5 to an original position of the cartridge 5 at the standby portion 23 when the cartridge 5 is to be replaced.

Differently from the illustrated example, the number of the cartridges 5 that are picked up may be two or more. For example, the arm 21 may include multiple hold portions 27, and/or one hold portion 27 may hold multiple cartridges 5. In this case, for example, multiple heads 3 can be wiped simultaneously. For example, a cartridge 5 having no liquid retaining ability may be disposed behind a cartridge 5 having liquid retaining ability, and one head 3 can be wiped by the two cartridges 5.

The order of pick-up of the multiple cartridges 5 at the standby portion 23 may be set, as appropriate. For example, regarding the multiple first cartridges 5A, a used one is replaced with an unused one, as described previously. In the illustrated example, the multiple first cartridges 5A are arranged in one row in a predetermined direction (the D1 direction in the illustrated example) at the standby portion 23. In this example, the multiple first cartridges 5A may be picked up in order from one side (the −D1 side or the +D1 side) in the predetermined direction. The order of pick-up of the first cartridges 5A and the second cartridge 5B that are to be used for different situations may be set, as appropriate, obviously.

Differently from the illustrated example, the cartridge 5 may be not returned to the standby portion 23. While no particular illustration is provided, for example, the wiper 9 may include, separately from the standby portion 23, a collection portion as a place where a used cartridge 5 is placed. The hold portion 27 may move to the collection portion, release the cartridge 5, and place the cartridge 5 at the collection portion. In this case, for example, a probability that soil adhering to a used first cartridge 5A adheres to an unused first cartridge 5A disposed at the standby portion 23 is reduced.

When the cartridge 5 is to be returned to the standby portion 23, the cartridge 5 may be returned, differently from the illustrated example, to a place that differs from an original place of the cartridge 5. For example, depending on the configuration of the standby portion 23, the position of the cartridge 5 at the standby portion 23 may be displaced from the original position of the cartridge 5 due to an inertial force when the standby portion 23 moves. In such a case, the cartridge 5 may be returned to an empty place at the standby portion 23 according to circumstances. For example, the wiper 9 may include one or more cartridges 5, the number of the one or more cartridges 5 being less than the number of the cartridges 5 that can be supported by the standby portion 23. Each of the cartridges 5 may be returned to an empty place (not necessarily limited to an original place of each of the cartridges 5) at the standby portion 23. Note that the standby portion 23 may be considered to include the above-described collection portion in this form when the number of the cartridges 5 included in the wiper 9 is half or less of the number of the cartridges 5 that can be supported by the standby portion 23 and when a picked-up position and a returned position are totally different for all of the cartridges 5.

Differently from the illustrated example, replacement of the cartridge 5 may be performed in a form that does not satisfy the concept of "pick up". For example, the standby portion 23 may be able to support only one first cartridge 5A. After a used first cartridge 5A held by the hold portion 27 is placed at the collection portion, an unused first cartridge 5A at the standby portion 23 may be held by the hold portion 27. When replacement frequency of the first cartridge 5A is low, size reduction and the like of the standby portion 23 with such a configuration may be advantageous. Note that the concept of pick-up may be considered to be satisfied when the hold portion 27 can hold a cartridge 5 selectively from at least two cartridges 5 at the standby portion 23.

Replacement (or holding or releasing: hereinafter, the same applies) of the cartridge 5 may be performed at an appropriate time. For example, replacement of the cartridge 5 may be performed when a predetermined operation is performed on the operation unit (not illustrated) of the device 1. Replacement of the cartridge 5 may be performed when the controller 31 (FIG. 4) of the device 1 determines that time of replacement has come. The time may be, for example, a time when wiping is performed one or more predetermined times by the cartridge 5 held by the hold portion 27. The controller 31 may determine whether to perform replacement on the basis of information on a state (for example, soil) of the cartridge 5. The information on a state of the cartridge 5 may be obtained by, for example, an imager that images the cartridge 5 or a component that acquires information (when an effect of wiping of the nozzle surface 3*a* is decreased, replacement can be determined to be necessary) on the nozzle surface 3*a*.

(Configuration and Operation Relating to Replacement of Cartridge in First Embodiment)

As previously described, the relative movement of the hold portion 27 and the standby portion 23 to realize replacement of the cartridge 5 may be realized by the movement of either of the hold portion 27 and the standby portion 23 The relative movement of the hold portion 27 and the head 3 to move the cartridge 5 to a position at which the cartridge 5 comes into contact with the head 3 after replacement may be realized by the movement of either of the hold portion 27 and the head 3. Forms (movement directions, movement paths, and the like) of these relative movements or movements in absolute coordinate systems (a world coordinate system and a standard coordinate system) are optional.

The entirety of a configuration that realizes the aforementioned movements of the hold portion 27 relative to the standby portion 23 and the head 3 is referred to as an operation portion 45 (the sign is indicated in FIG. 4). The first to third embodiments differ from each other in terms of, mainly, a configuration of the operation portion. As understood from the following description, the operation portion 45 in the present embodiment includes, for example, the arm 21 and includes a configuration (a drive source 37 and the like described later) for moving the standby portion 23.

In the present embodiment, the relative movement of the hold portion 27 and the standby portion 23 for replacement is realized by both of the movement of the hold portion 27 and the movement of the standby portion 23. The relative movement of the hold portion 27 and the head 3 for moving the cartridge 5 to a position at which the cartridge 5 comes into contact with the head 3 after replacement is realized by the movement of the hold portion 27. Details are as follows.

As illustrated in FIG. 1, the arm 21 (the arm body 29) is positioned, with respect to the head 3, on a side (the −D3 side) that the nozzle surface 3*a* faces. As indicated by the arrows a2 and a3, the arm body 29 is rotatable around a rotation axis R1 orthogonal to a direction (the D3 direction) that the nozzle surface 3*a* faces. Note that the rotation axis R1 is not an actual shaft-like member but is an imaginary straight line that serves as the center of rotation. As indicated by the arrow a4, the hold portion 27 is supported by the arm body 29 to be movable in a direction orthogonal to the rotation axis R1. The hold portion 27 is positioned away (more specifically, for example, at a distal end of the arm body 29) from the rotation axis R1. The standby portion 23 is positioned at any one (in the illustrated example, an orientation opposite to an orientation at which the head 3 is positioned with respect to the rotation axis R1: the −D3 side) of orientations around the rotation axis R1 with respect to the arm 21 (the arm body 29).

In the aforementioned configuration, a rotation of the arm body 29 around the rotation axis R1 can relatively move the hold portion 27 toward and away from the standby portion 23 and relatively move the hold portion 27 toward and away from the head 3. In another point of view, the hold portion 27 can move between a position at which the hold portion 27 is adjacent to the standby portion 23 and a position at which the hold portion 27 is adjacent to the head 3 relatively to the standby portion 23 and the head 3.

When being positioned on the side of the standby portion 23 by a rotation of the rotation axis R1 of the arm body 29, the hold portion 27 can relatively move (in the illustrated example, relatively move in the D3 direction) toward and away from the standby portion 23 by moving with respect to the arm body 29 in the direction indicated by the arrow a4. This relative movement puts in and takes out the cartridge 5 held by the hold portion 27 with respect to the standby portion 23 (refer also to FIG. 3). In another point of view, the cartridge 5 can move around the rotation axis R1 relatively to the standby portion 23 without interfering (coming into contact) with the standby portion 23 by moving away from the standby portion 23 in the direction indicated by the arrow a4.

When being positioned on the side of the head 3 by a rotation of the rotation axis R1 of the arm body 29, the hold portion 27 can relatively move (relatively move in the D3 direction in the illustrated example) toward and away from the head 3 by moving with respect to the arm body 29 in the direction indicated by the arrow a4. Consequently, the cartridge 5 held by the hold portion 27 is caused to be in contact or non-contact with the nozzle surface 3*a* (refer also to FIG. 3). In another point of view, the cartridge 5 can move around the rotation axis R1 relatively to the head 3 without interfering (coming into contact) with the nozzle surface 3*a* by moving away from the nozzle surface 3*a* in the direction indicated by the arrow a4.

As indicated by the arrow a5, the standby portion 23 is movable in a direction (the D1 direction in the illustrated example) intersecting (for example, orthogonal to) a direction (the D3 direction in the illustrated example) from the rotation axis R1 toward the standby portion 23. This movement direction corresponds to the arrangement direction of the multiple cartridges 5 at the standby portion 23.

Consequently, when the hold portion 27 is positioned on the side of the standby portion 23 by the rotation of the arm body 29 around the rotation axis R1, the hold portion 27 and the standby portion 23 can relatively move in the arrangement direction of the multiple cartridges 5 at the standby portion 23. With this relative movement, for example, the hold portion 27 can select a cartridge 5 from the multiple cartridges 5 at the standby portion 23.

In the example in FIG. 1, the movement of the cartridge 5 relative to the head 3 and the standby portion 23 from the standby portion 23 to the position at which the cartridge 5 comes into contact with the nozzle surface 3*a* is performed in a plane parallel to a longitudinal direction (the D1 direction) of the head 3. That is, the relative movement of the cartridge 5 does not include a component in the D2 direction and includes only a component parallel to a D1-D3 plane. Specifically, the cartridge 5 at the standby portion 23 is held by the hold portion 27, then moves toward the +D3 side, rotates (arrows a2 and a3) around the rotation axis R1, moves toward the +D3 side, and comes into contact with the nozzle surface 3*a*.

The relative movement of the cartridge 5 from the standby portion 23 to the position at which the cartridge 5 comes into contact with the nozzle surface 3*a*, however, may include a component in the D2 direction. For example, depending on the configuration of the standby portion 23, the cartridge 5 is put in and taken out with respect to the standby portion 23 by moving in the D2 direction. While no particular illustration is provided, an example of such a form is a form in which the standby portion 23 includes a U-shaped member whose upper side is on the +D2 side in plan view (as viewed in the D3 direction) and in which the cartridge 5 includes a flange that is placed on (the +D3 side) the U-shaped member. In such a case, the relative movement of the cartridge 5 is not performed within a plane.

In the illustrated example, the hold portion 27 (and/or the cartridge 5 held by the hold portion 27; more specifically, the center between the cartridge 5 and the hold portion 27: the same applies to the followings in this paragraph) is positioned on a straight line intersecting the rotation axis R1 and is movable in parallel to the straight line. In this case, for example, a probability that an unnecessary moment is generated around the rotation axis R1 due to the own weight of the arm 21 when, for example, the hold portion 27 is positioned directly above or directly under the rotation axis R1 is reduced. The hold portion 27, however, may be not positioned on a straight line intersecting the rotation axis R1. That is, the hold portion 27 may be disposed on a straight line at a so-called skew position with respect to the rotation axis R1 and move in parallel along the straight line.

The aforementioned configuration can be modified variously. Examples are presented below.

The arrangement direction (the D1 direction in the illustrated example) of the multiple cartridges 5 at the standby portion 23 may be not orthogonal (more specifically, not at a skew position) to the rotation axis R1. For example, the multiple cartridges 5 may be arranged in the D2 direction in the example in FIG. 1. A cartridge 5 may be selected from the multiple cartridges 5 at the standby portion 23 by a relative movement of the hold portion 27 and the standby portion 23 in the D2 direction. For example, the standby portion 23 may be movable in the D2 direction in the example in FIG. 1.

For example, the standby portion 23 may hold the multiple cartridges 5 at a circumference around the rotation axis R1. In this case, the hold portion 27 can select a cartridge 5 from the multiple cartridges 5 at the standby portion 23 by moving around the rotation axis R1. Therefore, the standby portion 23 may be immobile.

As previously described, the standby portion 23 may be able to support only one cartridge 5. In such a form, a relative movement (the arrow a5) of the hold portion 27 and the standby portion 23 in the arrangement direction (the D1 direction in the illustrated example) of the multiple cartridges 5 is unnecessary. For example, the standby portion 23 may be immobile in the D1 direction in the example in FIG. 1.

The relative movement of the hold portion 27 and the standby portion 23 in the arrangement direction (the D1 direction in the illustrated example) of the multiple cartridges 5 may be realized by the movement of the hold portion 27 as an alternative or in addition to the movement of the standby portion 23. For example, the arm body 29 may move in the arrangement direction or the hold portion 27 may move in the arrangement direction with respect to the arm body 29.

When a rotation around the rotation axis R1 is performed, contact between the cartridge 5 held by the hold portion 27 and the head 3 may be allowed. Depending on a specific configuration of the standby portion 23, the number or the arrangement direction of the cartridges 5 disposed at the standby portion 23, a method of holding the cartridge 5 by the hold portion 27, and the like, the hold portion 27 may be immobile in the direction indicated by the arrow a4 with respect to the arm body 29.

The movement (the arrow a4) of the hold portion 27 relative to the head 3 and/or the standby portion 23 in the direction orthogonal to the rotation axis R1 may be realized not by the hold portion 27 moving with respect to the arm body 29 but by the arm body 29 itself moving in an absolute coordinate system. The relative movement (the arrow a4) may be realized by, as an alternative or in addition to the movement of the hold portion 27 and/or the arm body 29, a movement of the head 3 and/or the standby portion 23.

The standby portion 23 (and the head 3) may be disposed at any orientation around the rotation axis R1 and may be not disposed to face the nozzle surface 3*a* with the arm 21 therebetween. For example, the standby portion 23 may be disposed at a position at which the applicator 25 is disposed in FIG. 1.

(Configuration and Operation Relating to Supply of Cleaning Liquid in First Embodiment)

As previously described, the applicator 25 applies to the cartridge 5 a cleaning liquid with which the nozzle surface 3*a* is to be cleaned. Wiping with the cartridge 5 to which the cleaning liquid adheres improves an effect of cleaning by wiping. The cleaning liquid may be supplied to the cartridge 5, for example, at every time of wiping.

As illustrated in FIG. 1, the applicator 25 is positioned at any one of the orientations around the rotation axis R1, similarly to the standby portion 23. Therefore, a rotation of the arm body 29 around the rotation axis R1 can relatively move the hold portion 27 toward and away from the applicator 25. The applicator 25 supplies the cleaning liquid to the cartridge 5 (more specifically, the wipe member 13) when the hold portion 27 is positioned adjacent (the −D1 side in the illustrated example) to the applicator 25.

Note that, as understood from the description of the position of the standby portion 23, the applicator 25 may be disposed at any orientation around the rotation axis R1. In the illustrated example, the applicator 25 is positioned at an orientation between an orientation at which the head 3 is positioned and an orientation at which the standby portion 23 is positioned. A difference in angle between the orientations is 90°.

The position of the illustrated applicator 25 can be considered to be a midway of a path of the relative movement of the cartridge 5 from the standby portion 23 to the position at which the cartridge 5 comes into contact with the nozzle surface 3*a*. In such consideration, the applicator 25 is positioned at the middle of the aforementioned path in the illustrated example. The applicator 25, however, may be not positioned at the middle. The applicator 25 may be positioned, differently from the above, outside the path from the standby portion 23 to the nozzle 3*a*. For example, the position of the applicator 25 and the position of the standby portion 23 may be reversed.

The position of the illustrated applicator 25 can be considered to be between the position at which the hold portion 27 holds the cartridge 5 supported by the standby portion 23 and the position at which the cartridge 5 held by the hold portion 27 comes into contact with the nozzle surface 3*a*. More specifically, this can be expressed as follows. A position at which the cartridge 5 is picked up is considered as a start point, and a position at which the cartridge 5 comes into contact with the nozzle surface 3*a* is considered as an end point. A vector (a vector parallel to the D3 direction in the illustrated example) from the start point toward the end point is considered. A plane including the start point and orthogonal to the vector and a plane including the end point and orthogonal to the vector are considered. At this time, the applicator 25 (at least an opening through which the cleaning liquid is ejected) is positioned between the aforementioned two planes.

A specific form in which the applicator 25 applies the cleaning liquid to the cartridge 5 (the wipe member 13) may be any appropriate form.

For example, the applicator 25 may include a supply surface 25*a* facing the rotation axis R1 and cause the cleaning liquid to flow out through one or more openings (not illustrated) in the supply surface 25*a*. At this time, the cleaning liquid may remain as droplets on the supply surface 25*a*. The wipe member 13 may come into contact with the supply surface 25*a* to thereby apply the cleaning liquid to the wipe member 13. Note that, when the wipe member 13 comes into contact with the supply surface 25*a*, a movement of the hold portion 27 with respect to the arm body 29 in the direction indicated by the arrow a4 may be used and may be not used. The same applies to an example described next.

For example, the cleaning liquid may be caused to flow out through one or more openings (not illustrated) of the supply surface 25*a* in a state in which the wipe member 13 is in contact with the aforementioned supply surface 25*a*. In this case, differently from the above, flow-rate control in which the cleaning liquid is caused to remain as droplets on the supply surface 25*a* is unnecessary. Therefore, for example, the flow rate may be controlled on the basis of the amount of the liquid that can be held by the wipe member 13, and the like.

For example, the applicator 25 may eject the cleaning liquid in a shower-like form or a mist form through one or more openings (not illustrated) of the supply surface 25*a*. A movement of the hold portion 27 with respect to the arm body 29 in the direction indicated by the arrow a4 may be used (or not used) also in this example to move the cartridge 5 toward the supply surface 25*a*.

When ejecting the cleaning liquid in a shower-like form or a mist form as described above, the wipe member 13 may be, for example, away from the supply surface 25*a*. In this case, a probability that soil on the wipe member 13 adheres to the supply surface 25*a* when the cleaning liquid is supplied to the wipe member 13 that has been used once or more times is low. Note that waste of the cleaning liquid is easily reduced in the previously described form in which the wipe member 13 comes into contact with the supply surface 25*a*.

For example, differently from the illustrated example, when the applicator 25 is positioned below the rotation axis R1 or when the arm 21 can perform a more complex operation than in the illustrated example, the applicator 25 may be a tank that stores the cleaning liquid. The cartridge 5 may be put in and taken out with respect to the tank through an upper opening of the tank, and the cleaning liquid may be applied to the wipe member 13.

Note that supply of the cleaning liquid to the cartridge 5 may also clean the cartridge 5. For example, the applicator 25 in a form in which the cleaning liquid is supplied through the supply surface 25*a* may supply to the cartridge 5 the cleaning liquid of an amount with which the cleaning liquid flows down from the cartridge 5. In a form in which the cartridge 5 is dipped in the cleaning liquid stored in the tank, cleaning of the cartridge 5 is realized to some extent.

The cleaning liquid (component) may be in various forms and may be, for example, in a form that is the same as and/or similar to a publicly known form. An example of the cleaning liquid is a liquid that is the same as and/or similar to a solvent of the liquid ejected by the head 3. That is, a liquid that is identical or similar, except that no colorant is contained, to the liquid ejected by the head 3 may be used as the cleaning liquid. For example, the cleaning liquid may be water or an organic solvent. The cleaning liquid may contain a surfactant, a preservative, an antifungal agent, and/or the like as a component that is contained or not contained in the liquid ejected by the head 3.

Note that wiping may be performed without supply of the cleaning liquid. For example, wiping may be performed with no cleaning liquid after printing. In this case, for example, an ink adhering to the nozzle surface 3*a* during printing is wiped by the cartridge 5. Wiping may be performed with no cleaning liquid after cleaning by so-called capping.

The cleaning by capping is performed, for example, as follows. First, a cap (not illustrated) is placed (this is called capping) to cover the nozzle surface 3*a*, and a substantially sealed space is thereby formed by the nozzle surface 3*a* and the cap. In such a state, a liquid is ejected by the head 3 repeatedly to thereby remove a liquid having higher viscosity than in a standard state, a foreign substance, and/or the like with which the nozzles 11 are clogged. Thereafter, wiping may be performed with the cap detached.

(Specific Example of Hold Portion)

A configuration for the hold portion 27 to hold and release the cartridge 5 can be various. Some examples are presented below.

The hold portion 27 may, for example, grip the cartridge 5 (the illustrated example). As the hold portion 27 that performs such gripping, for example, a publicly known gripper for picking up products in the technical field of industrial robots may be employed. Note that, for convenience, description of embodiments may include description based on that a form in which the hold portion 27 grips the cartridge 5 is employed.

The hold portion 27 may, for example, attract the cartridge 5. Attraction may be, for example, vacuum attraction, electrostatic attraction, or attraction with an electromagnet. As the hold portion 27 that performs such attraction, for example, a publicly known end effector for picking up products in the technical field of industrial robots may be employed.

The hold portion 27 may, for example, hold the cartridge 5 by a clamp mechanism such as a main shaft of a machine tool. Specifically, for example, a rear end portion of the cartridge 5 may be inserted into a tapered hole of the hold portion 27 by a clamp mechanism in the hold portion 27, and the rear end portion may be positioned by an inner peripheral surface of the hole.

Note that an example of the aforementioned gripping, attraction, or clamping can be considered as a form in which the hold portion 27 (more specifically, for example, a drive portion of a motor, an air cylinder, an electrode, or the like) is driven or a form in which the hold portion 27 functions actively.

Differently from the above, the hold portion 27 may be not in the form of functioning actively. For example, a protrusion formed on one of the cartridge 5 and the hold portion 27 may be press-fitted (pushed) with respect to a recess formed on another one of the cartridge 5 and the hold portion 27 by moving the hold portion 27 relatively to the standby portion 23. The cartridge 5 may be held by the hold portion 27 with a force of friction between an outer surface of the protrusion and an inner surface of the recess. In detachment, the hold portion 27 may be moved, in a state in which the cartridge 5 is caught by an appropriate portion of the standby portion 23, relatively to the standby portion 23 to extract the protrusion from the recess. When the protrusion is inserted into the recess, a spring-type engagement claw may be engaged therewith. The engagement of the engagement claw may be released by causing the engagement claw to touch an appropriate portion of the standby portion 23.

Instead of the hold portion 27, the cartridge 5 may include a mechanism for holding and releasing. For example, the engagement claw described above may be included in the cartridge 5, not in the hold portion 27. However, costs of the wiper 9 as a whole are easily reduced when the hold portion 27 includes the mechanism.

FIG. 4 is a block diagram schematically illustrating, mainly, a configuration of a control system of the liquid ejection device 1. In the following description, FIG. 4 will be referred, as appropriate.

A specific configuration of the hold portion 27 in a form in which the cartridge 5 is gripped can be various. The specific configuration is, for example, as follows.

The hold portion 27 may include a base portion 27*a* and two fingers 27*b* extending from the base portion 27*a*. The two fingers 27*b* are movable in parallel to a direction (the D1 direction in FIG. 4) in which the two fingers 27*b* face each other. Consequently, the cartridge 5 is pinched and gripped by the two fingers 27*b*. Specific shapes of the base portion 27*a* and the fingers 27*b* are optional. Differently from the above, the two fingers 27*b* may rotate with a base side as a rotation axis to thereby pinch the cartridge 5 therebetween. The hold portion 27 may include two or more fingers.

The two (or more; hereinafter the same applies) fingers 27*b* are, for example, coupled to one drive source 27*c* via a couple mechanism (for example, a link mechanism), which is not illustrated, and are driven together by the drive source 27*c*. However, two drive sources 27*c* may be individually included in the two fingers 27*b*. Each of the drive sources 27*c* may generate a rotational motion and may generate a linear motion. A mechanism that converts a rotational motion into a linear motion or a mechanism that converts a linear motion into a rotational motion may be interposed between a drive source and the fingers 27*b*, and the type of the motion of the drive source and the type of the motion of the fingers 27*b* may thus differ from each other. With no such a mechanism interposed therebetween, the types of the motions of the drive source and the fingers 27*b* may be the same.

A specific example of the drive source 27*c* is a motor (the motor denotes an electric motor when simply referred to as "motor": hereinafter the same applies), an air cylinder, an air motor, a hydraulic cylinder, or a hydraulic motor. The motor may be a rotary motor and may be a linear motor. Examples of the mechanism that converts a rotational motion into a linear motion and/or the mechanism that converts a linear motion into a rotational motion are a link mechanism, a ball screw mechanism, a rack-and-pinion mechanism, and a cam mechanism. A mechanism (for example, a gear mechanism or a winding transmission mechanism) that contributes to a speed increase or a speed decrease may be interposed between the drive source 27*c* and the fingers 27*b*. Note that drive sources and mechanisms that are not necessarily suitable for the hold portion 27 are presented here as examples for later support.

The two fingers 27*b* pinch, for example, the grip portion 15*b* (in another point of view, a portion whose width is narrow) of the cartridge 5 in the direction (the D1 direction) of wiping. The two fingers 27*b*, however, may pinch the grip portion 15*b* in another direction and/or may pinch another portion (a portion whose width is not narrow).

For example, the hold portion 27 causes the base portion 27*a* to face the cartridge 5 from the rear side (the side opposite to the wipe member 13) of the cartridge 5 and pinches the cartridge 5 with the two fingers 27*b*. At this time, the tips of the two fingers 27*b* may be brought into contact or may be not brought into contact with the main portion 15*a* of the cartridge 5. The rear end of the grip portion 15*b* may be brought into contact or may be not brought into contact with the base portion 27*a*. Note that the hold portion 27 may cause the base portion 27*a* to face the cartridge 5 from a side (the D2 direction) of the cartridge 5 and pinch the cartridge 5 with the two fingers 27*b*.

While no particular illustration is provided, a surface of each of the two fingers 27*b* to be caused to touch the grip portion 15*b* and/or a surface of the grip portion 15*b* to be caused to touch the fingers 27*b* may include a configuration for restricting a relative movement of these two surfaces in a direction extending along the two surfaces. For example, one of the two surfaces may include a protrusion protruding in a direction in which the two surfaces face each other, and another one of the two surfaces may be include a recess to which the protrusion is fitted. For example, a member surface (for example, metal, resin, or ceramic) included in the fingers 27*b* may be overlapped by a sheet that is made of a material (for example, rubber) having a higher coefficient of friction than the member surface.

(Specific Example of Arm)

A configuration of the arm 21 that realizes the above-described movement of the hold portion 27 relative to the head 3 and the standby portion 23 can be various. Based on an illustrated example, a specific configuration will be presented below as an example.

As previously described, the arm 21 includes, for example, the arm body 29 and the hold portion 27. The arm 21 includes, for example, a base body (not illustrated). The arm body 29 is supported to be rotatable around the rotation axis R1 with respect to the base body.

As drive sources for driving each portion, the arm 21 includes, for example, the following drive sources: a drive source 33 that rotates the arm body 29 around the rotation axis R1 with respect to the base body: a drive source 35 that moves the hold portion 27 (base portion 27*a*) with respect to the arm body 29 in the direction of the arrow a4; and the drive source 27*c* (previously described) that drives the fingers 27*b* of the hold portion 27.

The drive source 33 is disposed, for example, at the base body or the arm body 29. The drive source 35 is disposed, for example, at the arm body 29 or the hold portion 27 (base portion 27*a*). The drive source 27*c* is disposed, for example, at the base portion 27*a*.

Description of the previously described drive source 27*c* may support the drive sources 33 and 35. For confirmation, description of the drive source 27*c* will be simplified and repeated. For example, these drive sources may generate a rotational motion or a linear motion. The type (the linear motion or the rotational motion) of the motion of each of the drive sources and the motion of a driven object (the arm body 29 or the base portion 27*a*) may be the same and may differ from each other. Each of the drive sources may be of an electric type, a pneumatic type, or a hydraulic type. An appropriate mechanism that transmits a driving force may be interposed between each of the drive sources and a control object (the arm body 29 or the base portion 27*a*).

A specific mechanism with which the arm body 29 is supported with respect to the base body (not illustrated) to be rotatable around the rotation axis R1 may be, for example, a mechanism that is the same as and/or similar to publicly known various mechanisms. For example, an appropriate bearing may be disposed. Similarly, a specific mechanism with which the hold portion 27 is supported to be movable in parallel to the arm body 29 may be a mechanism that is the same and/or similar to publicly known various mechanisms. For example, an appropriate linear guide may be disposed. These matters apply to another member that rotates relatively and another member that moves in parallel relatively. The description in this paragraph may support the other members even when not particularly mentioned.

(Specific Example of Standby Portion)

A configuration of the standby portion 23 may be various. The configuration is, for example as follows.

The standby portion 23 may have a shape like a container as in the illustrated example. The cartridge 5 may be supported by the container by being placed at a bottom of the container. The width (the D2 direction) of the inside of the container may be larger than or equal to a maximum width of a portion of the cartridge 5 that is to be housed in the container and may be, for example, less than twice or substantially equal to the maximum width.

Differently from the illustrated example, the standby portion 23 may have a shape like a cage. The cartridge 5 may be supported at a bottom of the cage. For example, the standby portion 23 may include a frame-like member supporting a flange of the cartridge 5. The frame-like member may include, for example, two beams extending parallel to each other in the D1 direction. The two beams may support multiple cartridges 5. Alternatively, the frame-like member may include, in addition or as an alternative to the aforementioned two beams, multiple beams extending parallel to each other in the D2 direction. Two of the beams adjacent to each other may support one cartridge 5.

Other than the aforementioned configuration, the configuration of the standby portion 23 can be various. Another example will be mentioned in another embodiment and described later with reference to FIG. 7 to FIG. 9.

The wiper 9 includes, for example, a bed 43 supporting the standby portion 23 to be movable in the direction indicated by the arrow a5, and a drive source 37 that drives the standby portion 23 with respect to the bed 43 in the direction indicated by the arrow a5.

The bed 43 may be, for example, fixed to the base body (previously described), which is not illustrated, supporting the arm body 29 to be rotatable around the rotation axis R1. In this case, the arm 21 and the standby portion 23 move together when a shift between a state in which the head 3 and a recording medium face each other and a state in which the head 3 and the wiper 9 face each other is realized by the movement of the wiper 9.

Description of the previously described drive source 27*c* may support the drive source 37. For confirmation, description of the drive source 37*a* will be simplified and repeated. For example, the drive source 37 may generate a rotational motion or a linear motion. The type (the linear motion or the rotational motion) of the motion of the drive source 37 may be the same as or differ from the motion of a driven object (the standby portion 23). A drive source 39 may be of an electric type, a pneumatic type, or a hydraulic type. An appropriate mechanism that transmits a driving force may be interposed between the drive source 37 and the standby portion 23.

(Specific Example of Applicator)

As previously described, application of the cleaning liquid to the wipe member 13 may be realized by contact of the wipe member 13 with the supply surface 25*a*, by ejection of the cleaning liquid from the supply surface 25*a*, or by dipping of the wipe member 13 in the cleaning liquid stored in a tank. The configuration of the applicator 25 may be an appropriate configuration in accordance with such various supply forms.

While no illustration is provided, the applicator 25 in a form in which the cleaning liquid is supplied from the supply surface 25*a* may include, for example, a tank in which the cleaning liquid is stored and a pump that delivers the cleaning liquid in the tank to the supply surface 25*a*. A valve that adjusts a flow rate may be disposed between the pump and the supply surface 25*a*. A supply amount of the cleaning liquid may be controlled by adjusting the pump and/or the valve.

Note that the applicator 25 may be, for example, fixed to the base body (previously described), which is not illustrated, supporting the arm body 29 to be rotatable around the rotation axis R1. In this case, for example, the applicator 25 and the arm 21 move together when the shift between the state in which the head 3 and a recording medium face each other and the state in which the head 3 and the wiper 9 face each other is realized by the movement of the wiper 9.

(Specific Example of Control System of Wiper)

The above-described operations of wiping and replacement of the cartridge 5 are realized by, for example, the controller 31 controlling a component of the device 1. The controller 31 may include, for example, a computer. While no particular illustration is provided, the computer may include, for example, a CPU (central processing unit), a ROM (read only memory), a RAM (random access memory), and an external storage. The CPU executes a program stored in the ROM and/or the external storage, and various types of functional portions that perform control and/or the like are constructed. Note that the controller 31 may be dispersed in a hardware manner at multiple positions and may include a logical circuit that performs only certain processing.

Examples of an object to be controlled by the controller 31 are the previously described drive sources 33, 35, 27*c*, and 37, and the pump and/or the valve (not illustrated) included in the applicator 25. Another example is the drive source 39 that drives the head 3 in the direction indicated by the arrow a1. Note that the description of the drive source 27*c* may also support the drive source 39. For example, the drive source 39 may generate a rotational motion or a linear motion. The type (the linear motion or the rotational motion) of the motion of the drive source 39 may be the same as or different from the motion of a driven object (head 3). The drive source 39 may be of an electric type, a pneumatic type, or a hydraulic type. An appropriate mechanism that transmits a driving force may be interposed between the drive source 39 and the head 3.

In the illustrated example, the drive sources 33, 35, 37, and 39 each include a motor, as expressed by a circle with M In this case, these drive sources are controlled by the controller 31 via a driver (signs are omitted) expressed by a rectangle with D. Note that, differently from FIG. 4, the controller 31 may include the driver. The drive source 27*c* includes an air cylinder in the illustrated example. In this case, the controller 31 controls the drive source 27*c* via a pneumatic circuit 41 positioned inside or outside the hold portion 27.

While no particular illustration is provided, the device 1 may include a sensor that detects a position and/or the like of a controlled object (the arm body 29, the base portion 27*a*, the fingers 27*b*, the standby portion 23, the head 3, and/or the like). The controller 31 may perform feedback control (full-closed type) based on a signal from the sensor. Alternatively, the controller 31 may perform feedback control (semi-closed type) based on signals from sensors included in various types of drive sources and/or a signal from the driver. The controller 31 may perform open-loop control in which no feedback is performed.

Summary of First Embodiment

As described above, the liquid ejection device 1 includes the liquid ejection head 3, the standby portion 23, the hold portion 27, and the operation portion 45 (the arm 21). The head 3 includes the nozzle surface 3*a*. The operation portion 45 moves the hold portion 27 relatively to the standby portion 23 and the head 3 from a position at which the hold portion 27 holds the wiping cartridge 5 that is not held by the hold portion 27 and that is supported by the standby portion 23 to a position at which the cartridge 5 held by the hold portion 27 comes into contact with the nozzle surface 3*a*.

Therefore, for example, the cartridge 5 is replaced without manual work, as previously described, and convenience of a user is improved. The cartridge 5 is replaced by moving the hold portion 27 to the standby portion 23, not by transporting the cartridge 5 from the standby portion 23 to the hold portion 27 with a robot that is separate from the arm 21. Therefore, for example, a configuration of the device as a whole for replacement can be simplified. Eventually, costs can be reduced.

The standby portion 23 may simultaneously support the first number (six in FIG. 1) of the cartridges 5, the first number being two or more. The hold portion 27 may pick up, from the first number of the cartridges 5 supported by the standby portion 23, one or more of the cartridges 5, the number (one in FIG. 1) of the one or more cartridges 5 being less than the first number.

In this case, for example, multiple unused cartridges 5 can be on standby at the standby portion 23. As a result, frequency of replenishment of unused cartridges 5 at the standby portion 23 by a user is reduced compared with a form (this form is also included in technology according to the present disclosure) in which only one unused cartridge 5 is on standby at the standby portion 23. Eventually, convenience of a user is improved. For example, with different types of cartridges 5 disposed at the standby portion 23, one of the cartridges 5 corresponding to a state of the nozzle surface 3*a* can be selected. As a result, the nozzle surface 3*a* is effectively cleaned.

The device 1 may return the cartridge 5 that has wiped the nozzle surface 3*a* to the standby portion 23.

In this case, for example, the used cartridge 5 and the unused cartridges 5 are positioned together at the standby portion 23. The cartridges 5 are thus easily managed. For example, in a form (this form is also included in technique according to the present disclosure) in which a used cartridge 5 is disposed at a collection portion that is separate from the standby portion 23, collection of a cartridge 5 from the collection portion and replenishment of a cartridge 5 to the standby portion 23 are performed. In the present embodiment, however, collection and replenishment of the cartridges 5 are simply performed at the standby portion 23. For example, the cartridge 5 returned to the standby portion 23 can be picked up and used again. Thus, for example, a specific cartridge 5 (5B) can be used repeatedly in an interval between uses of another or more cartridges 5 (5A) in a form in which multiple types of the cartridges 5 are used.

The device 1 may return the cartridge 5 that has wiped the nozzle surface 3*a* to an original position of the cartridge 5 at the standby portion 23.

In this case, for example, the position of a used cartridge 5 and the position of an unused cartridge 5 is not interchanged. A probability that the used and unused cartridges 5 are taken by mistake is thus reduced. In another point of view, an operation (in other words, a program) for the used cartridge 5 and the unused cartridge 5 not to be taken by mistake is simplified. For example, when the operation portion 45 picks up the cartridges 5 in order that is previously assigned to multiple places at the standby portion 23, the cartridges 5 can be picked up without being taken by mistake. In another point of view, the controller 31 is not required to store a correspondence of each cartridge 5 and a place where the cartridge 5 is disposed. Such an effect is exerted also in replacement of the cartridges 5 of different types.

The device 1 may include, at a midway of the path of the relative movement of the cartridge 5 from the standby portion 23 to the position at which the cartridge 5 comes into contact with the nozzle surface 3*a*, the applicator 25 that applies the cleaning liquid to the cartridge 5. In another point of view, the device 1 may include, between the position at which the hold portion 27 holds the cartridge 5 supported by the standby portion 23 and the position at which the cartridge 5 held by the hold portion 27 comes into contact with the nozzle surface 3*a*, the applicator 25 that applies the cleaning liquid to the cartridge.

In this case, for example, a path along which the hold portion 27 moves for replacement of the cartridge 5, supply of the cleaning liquid to the cartridge 5, and an operation of wiping is easily shortened. As a result, the device 1 is easily downsized.

The cartridge 5 may include the grip portion 15*b* that is to be gripped by the hold portion 27, the grip portion 15*b* being closer than a portion (the tip portion of the wipe member 13) of the cartridge 5 coming into contact with the nozzle surface 3*a* to the rear end portion of the cartridge 5. A width of the grip portion 15*b* in a predetermined direction (the D1 direction in the illustrated example) orthogonal to a direction from the distal end portion toward the rear end portion of the cartridge 5 is smaller than a width of at least another portion (the main portion 15*a* or the like) of the cartridge 5 in the predetermined direction.

In this case, for example, the grip portions 15*b* are spaced apart from each other when multiple cartridges 5 are arranged at the standby portion 23 in the D1 direction. Therefore, the fingers 27*b* can be inserted into gaps therebetween. That is, gripping by the hold portion 27 becomes easy. For example, a probability that the fingers 27*b* engage with the main portion 15*a* and cause a relative movement of the fingers 27*b* and the main portion 15*a* can be reduced. For example, the aforementioned engagement positions the fingers 27*b* and the grip portion 15*b*, reduces variations in the relative positions of the fingers 27*b* and the grip portion 15*b*, and stabilizes holding. Such an effect can be obtained with a simple structure in which the grip portion 15*b* is thinned. As a result, for example, the cartridge 5 is easily manufactured as a disposable cartridge at low costs. Costs for disposal and replacement of the cartridge 5 can be also reduced.

The aforementioned first number (the number of the cartridges 5 that can be supported by the standby portion 23, the number being two or more) of the cartridges 5 may each include the wipe member 13 that comes into contact with the nozzle surface 3*a*. The first number of the cartridges 5 may include the cartridges 5 (the first cartridge 5A and the second cartridge 5B) of two or more types that differ from each other in terms of the material of the wipe member 13.

In this case, for example, wiping can be performed with the cartridge 5 corresponding to a state of the nozzle surface 3*a*. As a result, for example, soil on the nozzle surface 3*a* can be effectively removed.

In the device 1, the relative movement of the cartridge 5 from the standby portion 23 to the position at which the cartridge 5 comes into contact with the nozzle surface 3*a* may be performed in a plane (the D1-D3 plane in the illustrated example) parallel to the longitudinal direction of the head 3.

In this case, the hold portion 27 does not move in the D2 direction in the relative movement from the standby portion 23 to the nozzle surface 3*a*. The wiper 9 thus can be easily downsized in the D2 direction. For confirmation, the relative movement mentioned here does not include a relative movement for "only" the shift between the state in which the head 3 and a recording medium face each other and the state in which the head 3 and the wiper 9 face each other.

The nozzle surface 3*a* may face one side (the −D3 side) in a first direction (the D3 direction in the illustrated example). The operation portion 45 (the arm 21, the drive source 37, and the like) may include a support portion (the arm body 29) positioned on the −D3 side with respect to the head 3. The arm body 29 may be rotatable around the rotation axis R1 orthogonal to the D3 direction. The hold portion 27 may be supported by the arm body 29 to be movable in the direction (the direction indicated by the arrow a4) orthogonal to the rotation axis R1. The standby portion 23 may be positioned at any one of the orientations around the rotation axis R1 with respect to the arm body 29.

In this case, for example, the head 3 and the standby portion 23 can be disposed at heights (positions in the D3 direction) that differ from each other. As a result, for example, the size of the device 1 in a D1-D2 plane can be easily reduced compared with second and third embodiments described later. When the device 1 is a large device such as that disposed in a factory, the floor area of the factory can be saved.

Second Embodiment (Configuration and Operation Relating to Replacement of Cartridge)

Figure 5:
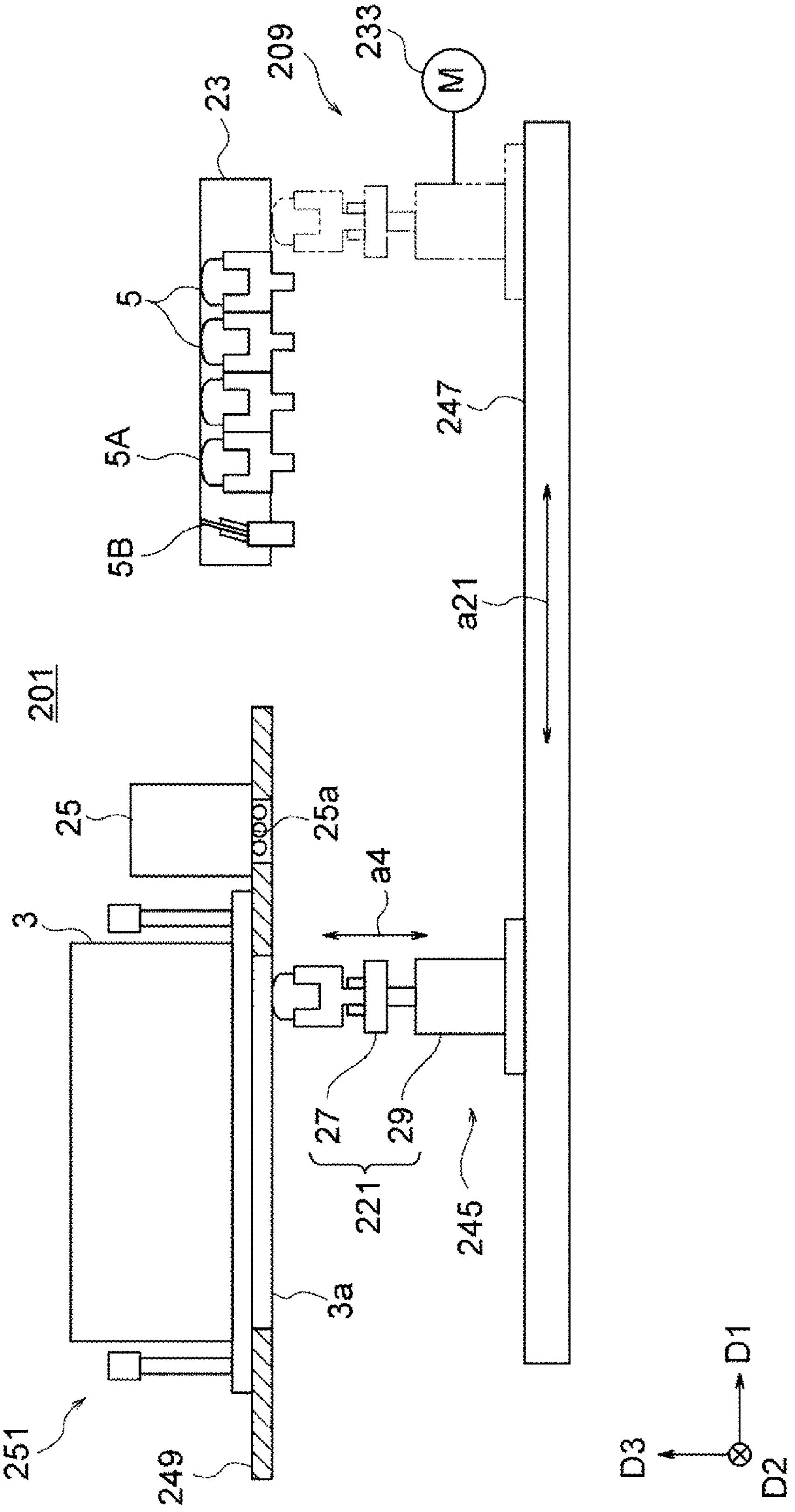
FIG. 5 is a schematic view illustrating a configuration of a principal portion of a liquid ejection device according to a second embodiment.

FIG. 5 is a schematic view illustrating a configuration of a principal portion of a liquid ejection device 201 (hereinafter may be referred to as "device 201") according to the second embodiment.

Similarly to the wiper 9 of the device 1 in the first embodiment, a wiper 209 of the device 201 moves the hold portion 27 relatively to the standby portion 23 and the head 3. Consequently, the cartridge 5 supported by the standby portion 23 is held by the hold portion 27. The cartridge 5 held by the hold portion 27 moves to a position at which the cartridge 5 comes into contact with the nozzle surface 3*a*. Note that a specific form of the relative movement differs from that in the first embodiment. For example, the specific form is as follows.

Differently from the first embodiment, the standby portion 23 is positioned in a direction (the D1 direction) orthogonal to a direction in which the nozzle surface 3*a* faces the head 3. The arm body 29 of an arm 221 is positioned, with respect to the head 3 and the standby portion 23, on the side (the −D3 side) that the nozzle surface 3*a* faces. Differently from the first embodiment, the arm body 29 is not rotatable around the rotation axis R1. The arm body 29 is instead movable in parallel to the D1 direction (the arrangement direction of the head 3 and the standby portion 23) as indicated by the arrow a21. Similarly to the first embodiment, the hold portion 27 is movable with respect to the arm body 29 in the direction (the D3 direction) indicated by the arrow a4.

In the aforementioned configuration, a parallel movement of the arm body 29 in the D1 direction can relatively move the hold portion 27 toward and away from the standby portion 23 and can relatively move the hold portion 27 toward and away from the head 3. In another point of view, the hold portion 27 can move, between the position at which the hold portion 27 is adjacent to the standby portion 23 and the position at which the hold portion 27 is adjacent to the head 3, relatively to the standby portion 23 and the head 3.

Similarly to the first embodiment, when the arm body 29 is positioned on the side of the standby portion 23 in the D1 direction, the hold portion 27 can put in and take out the cartridge 5 with respect to the standby portion 23 by moving with respect to the arm body 29 in the direction indicated by the arrow a4. Similarly to the first embodiment, when the arm body 29 is positioned on the side of the head 3 in the D1 direction, the hold portion 27 can cause the cartridge 5 to be in contact or non-contact with the nozzle surface 3*a* by moving with respect to the arm body 29 in the direction indicated by the arrow a4.

As understood from the above description, similarly to the first embodiment, the relative movement (a movement relative to the head 3 and the standby portion 23) of the cartridge 5 from the standby portion 23 to the position at which the cartridge 5 comes into contact with the nozzle surface 3*a* is performed in a plane parallel to the longitudinal direction (the D1 direction) of the head 3 in the second embodiment. That is, the relative movement of the cartridge 5 does not include a component in the D2 direction. Note that the movement of the cartridge 5 may include a component in the D2 direction due to a situation in which the position of the head 3 in the D2 direction and the position of the standby portion 23 in the D2 direction are displaced from each other, or the like.

Multiple cartridges 5 are arranged at the standby portion 23 in the D1 direction. Therefore, the aforementioned movement in the D1 direction for moving the arm body 29 (the hold portion 27) between the standby portion 23 and the head 3 can position the hold portion 27 selectively with respect to the multiple cartridges 5 supported by the standby portion 23. Therefore, differently from the first embodiment, the movement of the standby portion 23 in the D1 direction (the arrangement direction of the cartridges 5) is unnecessary. Naturally, the standby portion 23 may be movable for a purpose.

The parallel movement in which the arm body 29 (the hold portion 27) reciprocates between the standby portion 23 and the head 3 is performed in a direction (more specifically, for example, the D1 direction, which is the longitudinal direction of the nozzle surface 3*a*) parallel to the nozzle surface 3*a*. Therefore, the cartridge 5 can slide (perform wiping) with respect to the nozzle surface 3*a* by using the parallel movement of the hold portion 27. Eventually, differently from the first embodiment, the movement of the head 3 in the D1 direction (wiping direction) is unnecessary in the present embodiment. Naturally, the head 3 may be movable for a purpose.

The parallel movement of the arm body 29 may be realized by an appropriate configuration. In the illustrated example, the arm body 29 is supported by a bed 247 to be movable in parallel. As previously described, such a configuration may include, as appropriate, a linear guide and/or the like. The arm body 29 receives a driving force from a drive source 233 and moves. The description relating to the drive source 27*c* and the like previously described may support the drive source 233.

In the illustrated example, each of the cartridges 5 at the standby portion 23 is taken out from below by the arm 221. A configuration of the standby portion 23 (and the hold portion 27) for realizing such an operation may be various.

While no illustration is provided, for example, the standby portion 23 may include multiple claws each including an elastic member. Each cartridge 5 may be held by the standby portion 23 by being supported at a portion (for example, a flange) of the cartridge 5 by the multiple claws. When the cartridge 5 is to be taken out from the standby portion 23 or returned to the standby portion 23, engagement of the claws or releasing of the engagement of the claws may be realized by deforming the claws by a movement of the hold portion 27 in the direction indicated by the arrow a4. The aforementioned operation may be realized by claws made of a hard material and a spring that applies a resilience force to the claws.

While no illustration is provided, for example, the standby portion 23 may include a magnet or an electromagnet. The cartridge 5 may be supported by the standby portion 23 by being attracted by the magnet or the electromagnet. When the cartridge 5 is to be taken out from the standby portion 23, the cartridge 5 may be separated from the standby portion 23 against an attracting force by moving the hold portion 27 in the direction indicated by the arrow a4.

While no illustration is provided, for example, the standby portion 23 may include a support member having a U-shape in plan view (as viewed in the D3 direction). A portion (for example, a flange) of the cartridge 5 may be positioned on or above the support member by moving the cartridge 5 in the D1-D2 plane to the inside of the U-shape.

(Configuration and Operation Relating to Supply of Cleaning Liquid)

Similarly to the first embodiment, the applicator 25 that applies the cleaning liquid to the cartridge 5 is disposed at a midway of the path of the relative movement of the cartridge 5 from the standby portion 23 to the position at which the cartridge 5 comes into contact with the nozzle surface 3*a* in the second embodiment. In other words, the applicator 25 is positioned between (between a plane perpendicular to a vector from a start point to an end point and including the start point and a plane perpendicular to the vector and including the end point) a position (the start point) at which the hold portion 27 holds the cartridge 5 supported by the standby portion 23 and a position (the end point) at which the cartridge 5 held by the hold portion 27 comes into contact with the nozzle surface 3*a*.

Specifically, in the illustrated example, the applicator 25 is adjacent to the head 3 on the side of the standby portion 23 and is fixed together with the head 3 to a frame 249 (a support member). The material, the shape, and the dimensions of the frame 249 are optional. The frame 249 may support the head 3 and the applicator 25. When the head 3 and the applicator 25 are thus fixed, the head 3, the applicator 25, and the frame 249 may be considered to be included in a unit 251. The unit 251 may be considered as a head. In the illustrated example, the nozzle surface 3*a* and the supply surface 25*a* of the applicator 25 are not flush with each other. A step is formed between the nozzle surface 3*a* and the supply surface 25*a*. The nozzle surface 3*a* and the supply surface 25*a*, however, may be flush with each other. The supply surface 25*a* may be inclined to be smoothly connected to the nozzle surface 3*a*.

The unit 251 and the standby portion 23 may be not relatively movable and may be relatively movable. An example of a movement when the unit 251 and the standby portion 23 are relatively movable is a movement relating to the shift between a state in which the head 3 and a recording medium (the transport portion that transport the recording medium) face each other and a state in which the head 3 and a portion of the wiper 209 (except the applicator 25) face each other. For example, the bed 247 (the arm 221) and the standby portion 23 may move together to have the positional relationship in FIG. 5 after the transport portion withdraws from below the head 3.

Note that, differently from the above, for example, the head 3 may move in the state shift. For example, the state shift may be performed by, in a state in which the arm 221 is positioned on the side of the standby portion 223 in the D1 direction, putting in and taking out the transport portion with respect to a gap between the bed 247 that is unmovable and the head 3. In other words, a movement of the wiper 209 for "only" the state shift may be not performed separately from a movement of the cartridge 5 by an operation portion 245 from the standby portion 23 to the position at which the cartridge 5 can come into contact with the nozzle surface 3*a*. For example, only the bed 247 of the bed 247 and the standby portion 23 may move for the state shift.

Except for the aforementioned matters, an operation of the operation portion 245 (the arm 221 and the like) may be basically the same as and/or similar to the operation of the operation portion 45 in the first embodiment. The operation of the operation portion 245, however, may be different from that in the first embodiment due to the applicator 25 being adjacent to the head 3. For example, after coming into contact with the supply surface 25*a* of the applicator 25, the cartridge 5 held by the hold portion 27 may move in the D1 direction while maintaining a position of the cartridge 5 in the D3 direction at the time of the contact. That is, the cartridge 5 may come into contact with the nozzle surface 3*a* by moving in the D1 direction instead of coming into contact with the nozzle surface 3*a* by moving in the direction indicated by the arrow a4.

Alternative Embodiment of Second Embodiment

A configuration of the second embodiment can be variously changed. Examples are as follows.

As mentioned also in the first embodiment, the movement of the hold portion 27 in the direction indicated by the arrow a4 can be omitted. In another point of view, while the arm body 29 moves from the standby portion 23 toward the head 3 in the D1 direction, the cartridge 5 may be allowed to come into contact with the nozzle surface 3*a*. The standby portion 23 may have a configuration in which the movement of the hold portion 27 in the direction indicated by the arrow a4 is unnecessary.

A difference between the first embodiment and the second embodiment can be considered as a difference between the rotational motion (rotational movement) and the linear motion (parallel movement) in the motion (movement) of the arm body 29 between the standby portion 23 and the head 3. When considered as above, the direction of the parallel movement is not limited the D1 direction and may be the D2 direction. In another point of view, the direction of the parallel movement is not limited to the longitudinal direction of the nozzle surface 3*a* and may be a short direction of the nozzle surface 3*a*.

The first embodiment can be considered as a form in which the arm body 29 moves in the D1-D3 plane. The second embodiment can be considered as a form in which the arm body 29 moves in the D1-D2 plane. In this case, the movement of the arm body 29 in the first embodiment is not limited to the rotational movement and may include a parallel movement in the D1-D3 plane. The movement of the arm body 29 in the second embodiment may include a rotational movement in the D1-D2 plane. While no illustration is provided, for example, the arm body 29 that rotates around a rotation axis parallel to the D3 direction and the hold portion 27 that is supported by the arm body 29 to be movable in the D3 direction may be included in an arm in an alternative embodiment of the second embodiment. A trajectory of the cartridge 5 is not limited to a simple trajectory, such as a circle or a straight line, and may be any trajectory in any of the embodiments.

Multiple cartridges 5 may be arranged at the standby portion 23 in the D2 direction. In this case, for example, the standby portion 23 may move in the D2 direction or the arm 221 may move in the D2 direction to select a cartridge 5 from the multiple cartridges 5.

Summary of Second Embodiment

As described above, also in the present embodiment, the operation portion 245 moves the hold portion 27 relatively to the standby portion 23 and the head 3 from the position at which the hold portion 27 holds the cartridge 5 that is not held by the hold portion 27 and that is supported by the standby portion 23 to the position at which the cartridge 5 held by the hold portion 27 comes into contact with the nozzle surface 3*a*. Therefore, an effect that is the same as and/or similar to that in the first embodiment is exerted. For example, the cartridge 5 is replaced without manual work, and convenience of a user is improved.

As indicated in the present embodiment, the nozzle surface 3*a* may face one side (the −D3 side) in the first direction (the D3 direction in the illustrated example). The standby portion 23 may be positioned, with respect to the head 3, in a second direction (the D1 direction) orthogonal to the D3 direction. The support portion (the arm body 29) may be positioned, with respect to the head 3 and the standby portion 23, on the +D3 side (the side that the nozzle surface 3*a* faces). The arm body 29 may be movable in the D1 direction. The hold portion 27 may be supported by the arm body 29 to be movable in the D2 direction.

In this case, for example, the arm body 29 can be moved, as described previously, in the direction along the nozzle surface 3*a*. Thus, the relative movement of the cartridge 5 for wiping and the relative movement in which the cartridge 5 reciprocates between the standby portion 23 and the head 3 can be realized by the same configuration (for example, the drive source 233). As a result, the wiper 209 can be downsized easily. When multiple cartridges 5 are arranged at the standby portion 23 in the D1 direction, the relative movement for selecting a specific cartridge 5 from the multiple cartridges 5 also can be realized by the same configuration (for example, the drive source 233).

Third Embodiment

Figure 6:
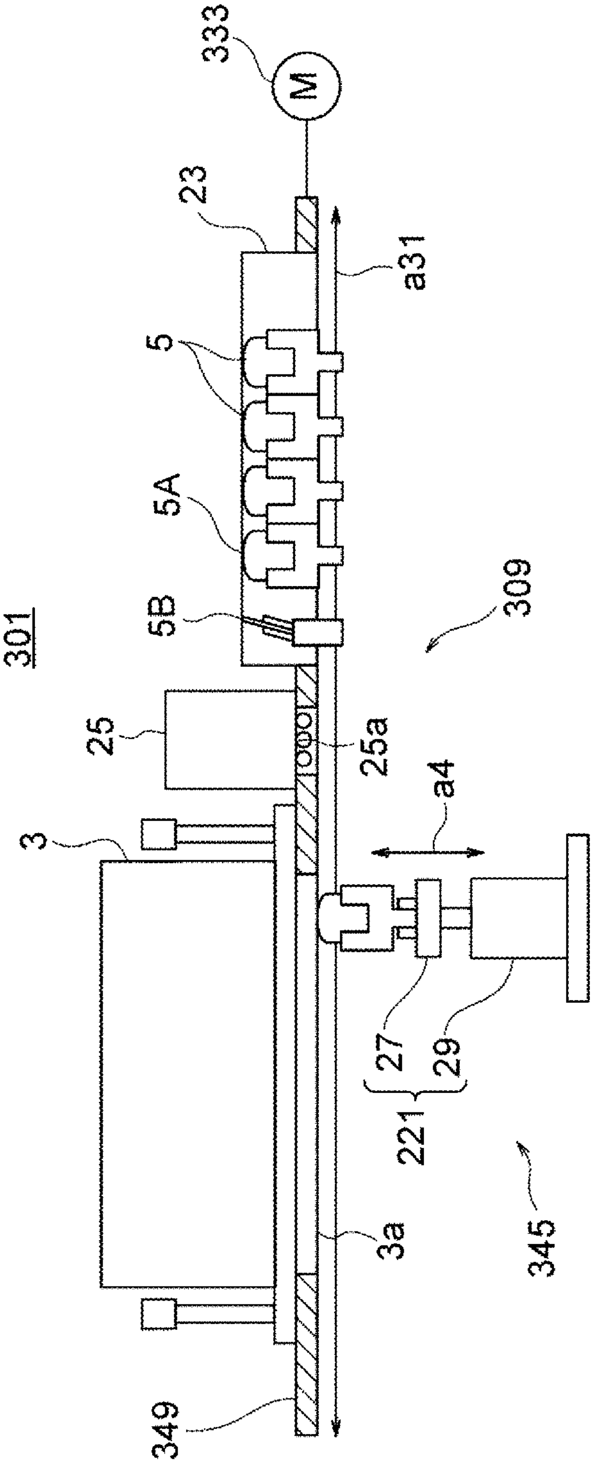
FIG. 6 is a schematic view illustrating a configuration of a principal portion of a liquid ejection device according to a third embodiment.

FIG. 6 is a schematic view illustrating a configuration of a principal portion of a liquid ejection device 301 (hereinafter may be referred to as "device 301") according to a third embodiment.

In the second embodiment, the arm 221 moves in the absolute coordinate system, and the arm 221 thereby moves relatively to the head 3 and the standby portion 23. In the third embodiment, the head 3 and the standby portion 23 move in an absolute coordinate system as indicated by the arrow a31, and the arm 221 thereby moves relatively to the head 3 and the standby portion 23. Other than this, the third embodiment is generally the same as and/or similar to the second embodiment. A more specific configuration of the third embodiment can be various. The more specific configuration in the illustrated example is as follows.

In the illustrated example, the head 3, the applicator 25, and the standby portion 23 are fixed to each other by a frame 349. The description of the frame 249 in the second embodiment may support the frame 349. The frame 349 receives a driving force from a drive source 333 and moves in the D1 direction. The description of the drive source 27*c* and the like may support the drive source 333.

The arm 221 may be unmovable and may be movable. An example of a movement when the arm 221 is movable is a movement relating to the shift between the state in which the head 3 and a recording medium (the transport portion that transports the recording medium) face each other and the state in which the head 3 and the arm 221 (a portion of a wiper 309) face each other. Note that, differently from the above, for example, the frame 349 may move in the state shift.

As described above, also in the present embodiment, an operation portion 345 moves the hold portion 27 relatively to the standby portion 23 and the head 3 from the position at which the hold portion 27 holds the cartridge 5 that is not held by the hold portion 27 and that is supported by the standby portion 23 to the position at which the cartridge 5 held by the hold portion 27 comes into contact with the nozzle surface 3*a*. Therefore, an effect that is the same as and/or similar to that in the first embodiment is exerted. For example, the cartridge 5 is replaced without manual work, and convenience of a user is improved.

As indicated in the present embodiment, the nozzle surface 3*a* may face one side (the −D3 side) in the first direction (the D3 direction in the illustrated example). The standby portion 23 may be positioned, with respect to the head 3, in the second direction (the D1 direction) orthogonal to the D3 direction. The operation portion 345 may include a movement portion (the frame 349) and a support portion (the arm body 29). The frame 349 may support the head 3 and the standby portion 23 and may be movable in the D1 direction. The arm body 29 may be positioned, with respect to the head 3 and the standby portion 23, on the +D3 side (the side that the nozzle surface 3*a* faces). The hold portion 27 may be supported by the arm body 29 to be movable in the D2 direction.

In this case, the movement of the hold portion 27 relative to the head 3 and the standby portion 23 may be performed in the direction along the nozzle surface 3*a*. Therefore, for example, an effect that is the same as and/or similar to that in the second embodiment is exerted. For example, the relative movement of the cartridge 5 (the hold portion 27) for wiping and the relative movement in which the cartridge 5 (the hold portion 27) reciprocates between the standby portion 23 and the head 3 can be realized by the same configuration (for example, the frame 349 and the drive source 333). As a result, the wiper 309 can be downsized easily. In the second embodiment, the movement of the head 3 can be omitted. In the third embodiment, the movement of the arm 221 can be omitted. Either one of the second and third embodiments may be selected in accordance with an overall configuration and the like of the liquid ejection device.

Alternative Embodiments and the Like

Hereinafter, three alternative embodiments (FIG. 7 to FIG. 9) of the standby portion 23, an example (FIG. 10) of processing relating to automatic replacement of the cartridge 5, an alternative embodiment (FIG. 11) of the operation of wiping, a specific example (FIG. 12 and FIG. 13) of a printer, and an example (FIG. 14) of a configuration in which multiple heads 3 are wiped will be described.

First Alternative Embodiment of Standby Portion

Figure 7:
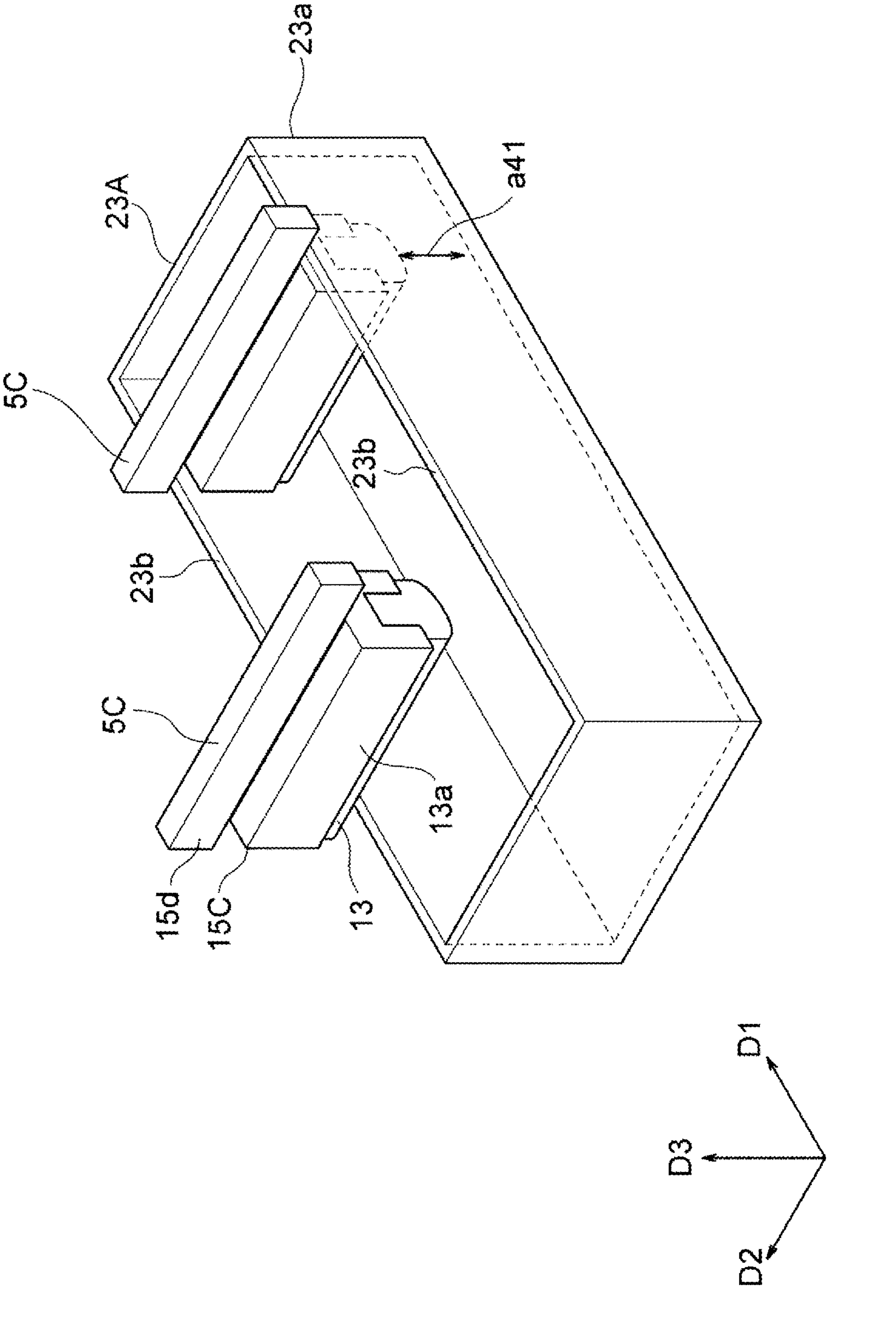
FIG. 7 is a perspective view illustrating configurations of a standby portion and a wiping cartridge according to a first alternative embodiment.

FIG. 7 is a perspective view illustrating configurations of a standby portion 23A and a cartridge 5C according to an alternative embodiment.

In this alternative embodiment, the cartridge 5C does not touch a bottom surface of the standby portion 23A (a container 23*a*). Consequently, for example, a probability that the cleaning liquid (in another point of view, soil contained in the cleaning liquid) that has dripped from a used cartridge 5C adheres to an unused cartridge 5C by following the bottom surface of the standby portion 23A is reduced. Details are, for example, as follows.

Similarly to the standby portion 23 in the embodiments, the standby portion 23A, for example, includes the container 23*a*. Similarly to the cartridge 5 in the embodiments, the cartridge 5C includes the wipe member 13 and a holder 15C holding the wipe member 13. A grip portion 15*d* of the holder 15C is larger than an opening of the container 23*a* in the D2 direction (a direction orthogonal to the arrangement direction of multiple cartridges 5). Therefore, when the cartridge 5C is to be housed in the container 23*a*, the grip portion 15*d* engages from above with upper ends 23*b* of two side surfaces (surfaces orthogonal to the D2 direction) of the container 23*a*. At this time, the wipe member 13 is away from the bottom surface of the container 23*a* as indicated by the arrow a41.

Note that this alternative embodiment can be variously changed. Examples are as follows.

The container 23*a* may include, at each of two inner surfaces facing each other in the D2 direction, a beam extending in the D1 direction. A portion of the cartridge 5C, the portion being longer than a space between the two beams in the D2 direction, may be supported by the two beams. While such support is performed, the wipe member 13 may be away from the bottom surface of the container 23*a*.

Multiple beams that extend in the D2 direction and that are bridged between two side surfaces of the container 23*a* facing each other in the D2 direction may be arranged in the D1 direction. Each cartridge 5C may be disposed between two beams that are adjacent to each other. A portion of the cartridge 5C, the portion being longer than a space between the two beams in the D1 direction, may be supported by the two beams. While such support is performed, the wipe member 13 may be away from the bottom surface of the container 23*a*. The height (the position in the D3 direction) of an upper surface of each of the beams may be the same as or lower than the height of each of the upper ends 23*b* of the container 23*a*.

The aforementioned frame structure including the beams extending in the D1 direction and/or the beams extending in the D2 direction and the container 23*a* positioned below the frame structure may be separate from each other. The frame structure and the container 23*a* may be fixed to each other to be easily detachable.

As described in the second embodiment, the cartridge 5 may be supported, at the standby portion 23, by a claw, a magnet, or an electromagnet. The cartridge 5 may be supported at a position away from the bottom surface of the container 23*a* by the standby portion 23 with these components being disposed at appropriate heights with respect to the container 23*a*.

As understood from the above description, a portion of the cartridge 5C to be supported may project in at least one of the D1 direction and the D2 direction with respect to a portion of the cartridge 5C on the distal end side (the side of the wipe member 13). When a magnet or the like is used, a projection may be not included.

A portion of the cartridge 5C, the portion being supported by positioning portions (the upper ends 23*b* of the container 23*a* and/or the above-described beams) of the standby portion 23, is not limited to be included in the grip portion 15*d*. For example, the main portion 15*a* may include the portion to be supported. Note that the portion to be supported is positioned, for example, closer to the rear end side with respect to the center of gravity of the cartridge 5C. Consequently, the cartridge 5C can be easily supported by the standby portion 23 in a state in which the rear end portion (in other words, the portion to be held by the hold portion 27) of the cartridge 5C is directed upward.

The container 23*a* may store only the cleaning liquid that has dripped from a used cartridge 5 and may drain the cleaning liquid through a drainage port in the bottom surface. In the former case, for example, the bottom surface of the container 23*a* may be horizontal and may be inclined to be lowered toward the used cartridge 5. In the latter case, for example, the bottom surface of the container 23*a* may be horizontal and may be inclined to be lowered toward the drainage port.

As described above, the standby portion 23 may include the container 23*a* that houses at least a lower portion of each of the first number (two or more) of the cartridges 5 and the positioning portions (the upper ends 23*b* of the container 23*a* in the illustrated example) that position the first number of the cartridges 5 to be above and away from the bottom surface of the container 23*a*.

In this case, as previously described, for example, a probability that the cleaning liquid that has dripped from a used cartridge 5 adheres to an unused cartridge 5 is reduced. Eventually, a probability that an unused cartridge 5 is stained by soil contained in the cleaning liquid that has dripped is reduced. Note that, as understood from the above description, the positioning portions may be portions of the container when the standby portion includes the container and the positioning portions.

Second Alternative Embodiment of Standby Portion

Figure 8:
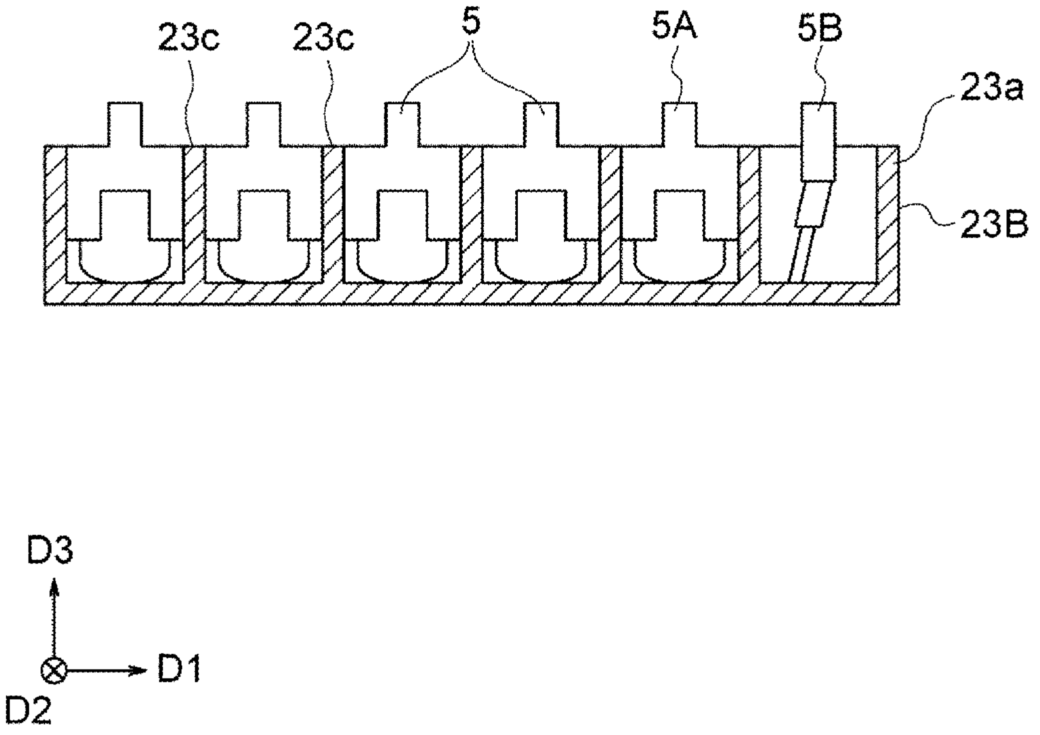
FIG. 8 is a sectional view illustrating a configuration of a standby portion according to a second alternative embodiment.

FIG. 8 is a sectional view illustrating a configuration of a standby portion 23B according to an alternative embodiment.

As illustrated in FIG. 8, the standby portion 23B includes multiple partitions 23*c* partitioning the inside of the container 23*a*. The multiple partitions 23*c* form multiple spaces in each of which a corresponding one of the multiple cartridges 5 is individually housed.

Consequently, for example, a probability of contact between the cartridges 5 adjacent to each other at the standby portion 23 is reduced. As a result, for example, a probability that a used cartridge 5 and an unused cartridge 5 come into contact with each other and cause soil on the used cartridge 5 to adhere to the unused cartridge 5 is reduced.

A configuration of the partitions 23*c* may be an appropriate configuration. For example, the configuration is as follows.

The partitions 23*c* may be continuous with the bottom surface of the container 23*a*. In this case, for example, a probability that the cleaning liquid that has dripped from a used cartridge 5 reaches an unused cartridge 5 by following the bottom surface of the container 23*a* is reduced.

The partitions 23*c*, however, may be not continuous with the bottom surface of the container 23*a*. In this case, for example, the alternative embodiment described with reference to FIG. 7 and in which the cartridge 5 is separated from the bottom surface of the container 23*a* may be combined with the partitions 23*c*. At this time, upper ends of the partitions 23*c* may be used as positioning portions that separate the cartridge 5 from the bottom surface of the container 23*a*.

Regarding the position in the D3 direction, the upper ends of the partitions 23*c* may be at the same heights with respect to the upper ends of the container 23*a* and may be lower or higher than the upper ends of the container 23*a*. The upper ends of the partitions 23*c* are, however, positioned at least higher than a lower end (leading end) of the cartridge 5. In other words, at least a portion of each of the partitions 23*c* in a range in the D3 direction overlaps at least a portion of each cartridge 5 in the range in the D3 direction (at least a portion of each of the partitions 23*c* and at least a portion of each of the cartridges 5 overlap each other when viewed in the D1 direction).

A space between two partitions 23*c* adjacent to each other may have a size with which a cartridge 5 is fitted between the two partitions 23*c* or may be larger than the size. Each of the partitions 23*c* may be planar and may be not planar.

Third Alternative Embodiment of Standby Portion

Figure 9:
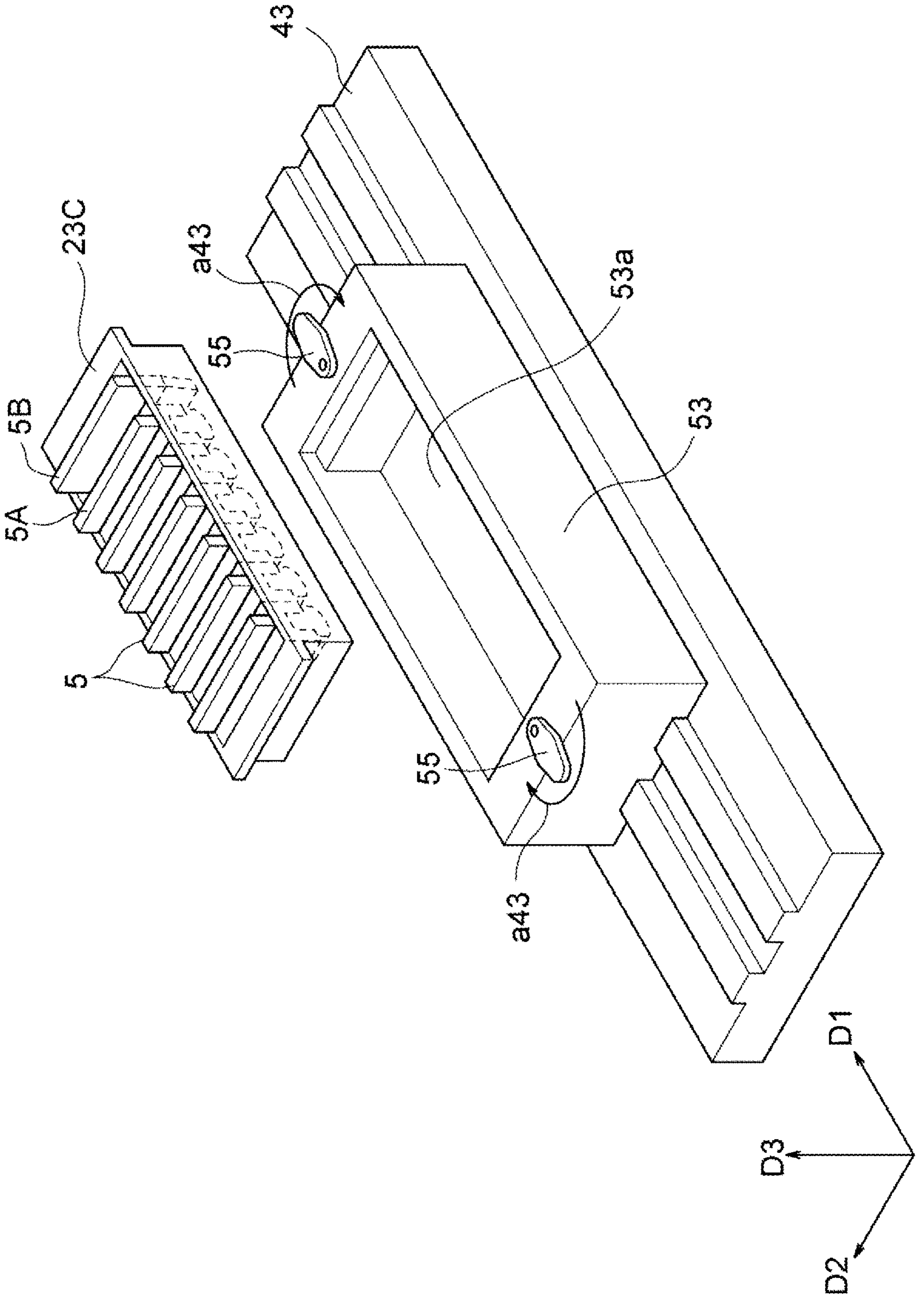
FIG. 9 is a perspective view illustrating a configuration of a standby portion according to a third alternative embodiment.

FIG. 9 is a sectional view illustrating a configuration of a standby portion 23C according to an alternative embodiment.

Note that the bed 43 according to the first embodiment is illustrated in FIG. 9. For convenience, signs according to the first embodiment may be used. This alternative embodiment, however, may be applied to another embodiment.

The standby portion 23C is detachable and attachable in this alternative embodiment. Therefore, for example, multiple unused cartridges 5 and multiple used cartridges 5 can be replaced together with the standby portion 23C That is, multiple cartridges 5 stored in the device 1 can be replaced at the same time. As a result, convenience of a user is improved.

A configuration with which the standby portion 23C is made detachable and attachable can be various. For example, the configuration is as follows.

The example in FIG. 9 includes a slider 53 movable with respect to the bed 43 in the D1 direction. The slider 53 includes a recess 53*a* to which the standby portion 23C having a container-like shape is almost fitted. The standby portion 23C is attached to and detached from the slider 53 by being put in and taken out with respect to the recess 53*a*.

The example in FIG. 9 also includes a claw 55 rotatable around an axis (refer to the arrow a43) parallel to the D3 direction with respect to the slider 53. After the standby portion 23C is housed in the recess 53*a*, the claw 55 is rotated to be positioned on or above the standby portion 23C. An upward movement of the standby portion 23C with respect to the slider 53 can be thereby restricted.

While no particular illustration is provided, a claw to which a resilience force is applied by a spring may be engaged with the standby portion 23C, and the standby portion 23C may be mounted on the slider 53. In this case, for example, a single-touch attaching/detaching method may be used. For example, in the process of insertion of the standby portion 23C into the recess 53*a*, the claw pressed by a predetermined portion of the standby portion 23C may temporarily retract against the resilience force of the spring. Thereafter, the claw may project and engage with the predetermined portion after passing the predetermined portion due to the resilience force of the spring. An operation member, such as a slide button, coupled to the claw may be operated to release the engagement.

As understood from the example presented above, various configurations with which mounting and dismounting of the standby portion 23C are easily performed may be employed as a configuration that realizes attaching and detaching. The "mounting and dismounting (attaching and detaching) are easily performed" may denote that, for example, a user can perform mounting and dismounting manually without using a tool and/or the like. For example, the attaching and detaching may include a form in which a screw-shaped member that can be turned manually, without using a tool, is fastened to fix the standby portion 23C to the slider 53.

Note that, for example, the frame 349 in the third embodiment may include an opening through which the standby portion 23 is exposed. The standby portion 23 may overlap, at an edge portion of the container of the standby portion 23 or at a flange at the edge portion or the like, the periphery of the opening of the frame 349. The frame 349 may include a recess, a claw, and/or the like that positions the edge portion of the container or the flange in a D1-D2 direction. Attaching and detaching may be thus realized as in FIG. 9. The second embodiment may also include a frame that supports the standby portion 23 to be attachable and detachable.

The slider 53, the frame 349, or the like that the standby portion 23 is attached to and detached from may be considered more generically as an attachment-detachment portion that the standby portion 23 is attached to and detached from. As understood from the previous description, the attachment-detachment portion may be a component that moves in an absolute coordinate system and may be a component that does not move.

(Example of Processing Relating to Automatic Replacement of Cartridge)

As previously described, replacement of multiple cartridges 5 may be performed automatically by the controller 31. The processing procedure thereof may be an appropriate processing procedure. An example thereof is as follows.

Figure 10:
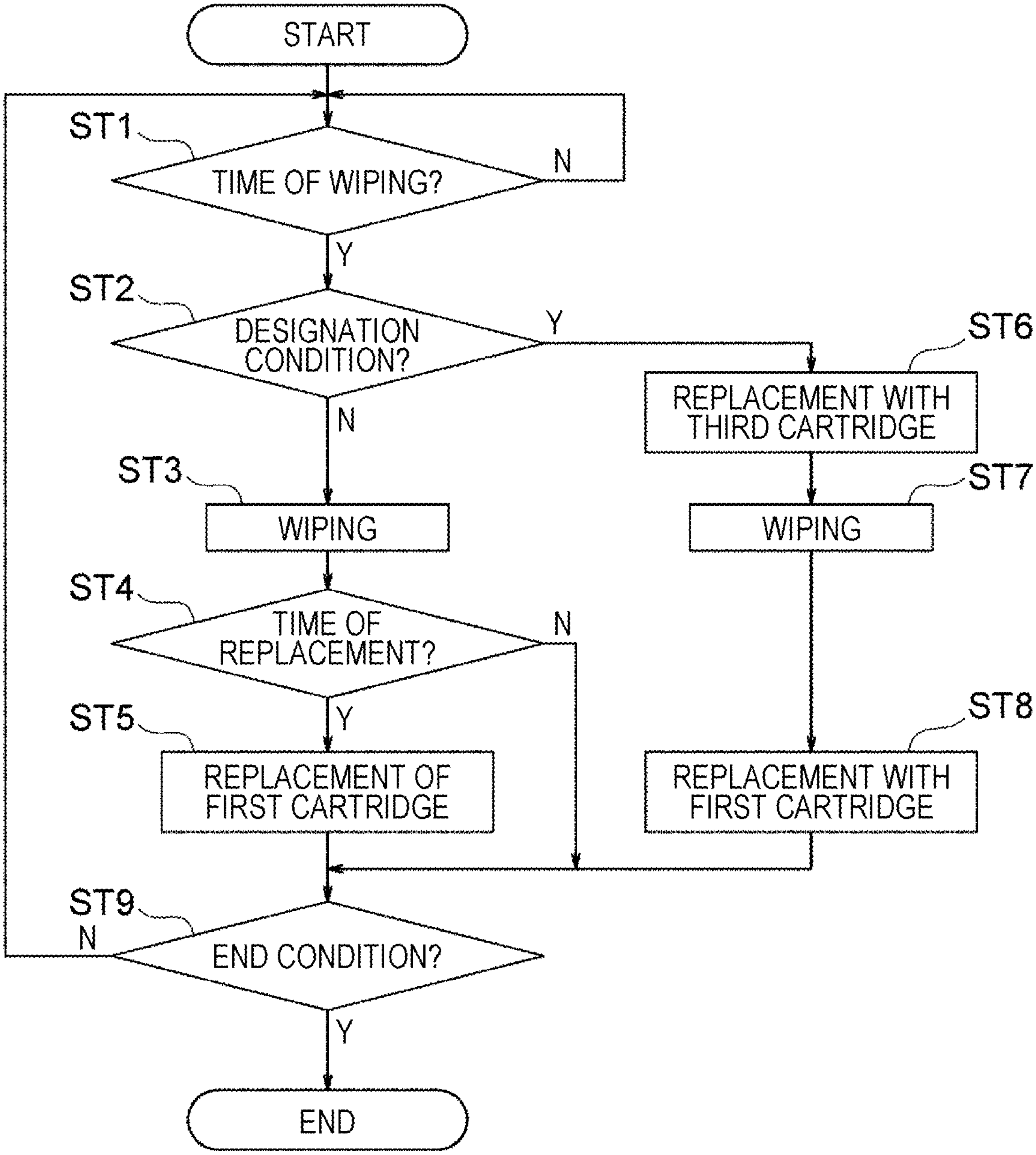
FIG. 10 is a flowchart illustrating one example of a procedure of processing relating to replacement of a wiping cartridge.

FIG. 10 is a flowchart illustrating one example of a processing procedure relating to replacement of the cartridge 5 executed by the controller 31.

The illustrated processing is one example of processing performed by the controller 31 in a form in which the first cartridge 5A is basically used and in which a third cartridge (not illustrated) is used in a specific situation in which, for example, soil has accumulated on the nozzle surface 3*a*. The third cartridge (illustration and detailed description are omitted) has, for example, a higher soil removing effect than the first cartridge 5A. For example, a cartridge including a wipe member rotatable by a motive power may be used as the third cartridge. The illustrated processing may be started, for example, when the operation of the device 1 is started. Note that a procedure of processing in which the first cartridge 5A is first held by the hold portion 27 is omitted in FIG. 10. In a step ST1, the first cartridge 5A has already been held by the hold portion 27.

In the step ST1, the controller 31 determines whether a time of wiping has come. As previously described, this time may be set, as appropriate. For example, the time may be a time of the operation of the device 1, a time of a start of printing after the operation, or a time after the printing is performed for a predetermined time length. Whether wiping is necessary may be determined on the basis of a signal from a sensor that detects a state of the nozzle surface 3*a* or on the basis of a predetermined operation by a user. When determined positive (determined that wiping is necessary), the controller 31 proceeds to a step ST 2. When determined negative, the controller 31 repeats the step ST1 in a predetermined cycle.

In the step ST2, the controller 31 determines whether a predetermined designation condition is satisfied. This designation condition is a condition with which whether wiping with the third cartridge is necessary is determined and may be various conditions. For example, the designation condition may be a situation in which an elapsed time from a start of ejection of a liquid by the device 1 has reached a predetermined time, a situation in which the number of times of wiping performed by the first cartridge 5A has reached a predetermined number that is one or more, and/or a situation in which a state of the nozzle surface 3*a* detected by the sensor is a predetermined state. Note that, differently from the description here, a situation in which an operation of designating the third cartridge is performed by a user in a period from previous wiping with the third cartridge to a current time may be used as the designation condition. When determined positive (determined that wiping with the third cartridge is necessary), the controller 31 proceeds to a step ST6. When determined negative, the controller 31 proceeds the step ST3.

In the step ST3, the controller 31 performs processing for wiping with the cartridge 5 (that is, the first cartridge 5A) held by the hold portion 27.

In the step ST4, the controller 31 determines whether a time of replacement of the first cartridge 5A used in the step ST3 has come. As previously described, the time may be set as appropriate. For example, the time of replacement may be a time when an elapsed time from a start of ejection of a liquid by the device 1 has reached a predetermined time, a time when the number of times of wiping performed by the first cartridge 5A held by the hold portion 27 has reached a predetermined number that is one or more, and/or a time when a state of the cartridge 5 detected by the sensor is a predetermined state. Note that, differently from the description here, a time when an operation of replacing the first cartridge 5A is performed by a user in a period from previous wiping with the first cartridge 5A that is currently held to a current time may be determined as the time of replacement. When determined positive, the controller 31 proceeds to a step ST5. When determined negative, the controller 31 skips the step ST5 and proceeds to a step ST9.

In the step ST5, the controller 31 performs processing for replacing the first cartridge 5A held by the hold portion 27 with an unused first cartridge 5A that is on standby at the standby portion 23. Note that the order of the step ST3 and the steps ST4 and ST5 may be reversed.

When determined positive in the step ST2 and proceeded to the step ST6, the controller 31 performs processing for replacing the first cartridge 5A held by the hold portion 27 with the third cartridge.

In a step ST7, the controller 31 performs processing for performing wiping with the third cartridge held in the step ST6 by the hold portion 27. This processing may be the same processing as the step ST3 and may be a processing whose specific contents are different from those of the step ST3 in consideration of a difference in the type of the cartridges 5.

In a step ST8, the controller 31 performs processing for replacing the third cartridge held by the hold portion 27 with the first cartridge 5A. The first cartridge 5A that is to be held at this time may be a first cartridge 5A (a used first cartridge 5A) that has been held before the step ST6 and may be an unused first cartridge 5A.

In step ST9, whether an end condition of processing relating to wiping is satisfied is determined. The end condition may be, for example, a situation in which a predetermined operation that stops the operation of the device 1 is performed. When determined negative, the controller 31 returns to the step ST1. When determined positive, the controller 31 ends the illustrated processing. Note that, before ending the illustrated processing, the controller 31 may perform processing that returns the first cartridge 5A held by the hold portion 27 to the standby portion 23.

As described above, the device 1 may select (the steps ST2 and ST6), from the first number of the cartridges 5 (held by the standby portion 23, the number of the cartridges 5 being two or more), one or more of the cartridges 5 to be picked up by the hold portion 27 on the basis of information relating to the adhesion amount of a liquid with respect to the nozzle surface 3*a*. The information relating to the adhesion amount may be, for example, the time from a start of ejection, the number of times of wiping, and/or information from the sensor, which are described in the step ST2.

Such automatic selection of the cartridge 5 in accordance with soil on the nozzle surface 3*a* reduces the load of a user. A probability of an occurrence of ejection failure due to insufficient wiping and/or a probability of an occurrence of deterioration (for example, deterioration of a water-repellent film) of the nozzle surface 3*a* due to excessive wiping can be reduced.

Alternative Embodiment of Wiping Operation

Figure 11:
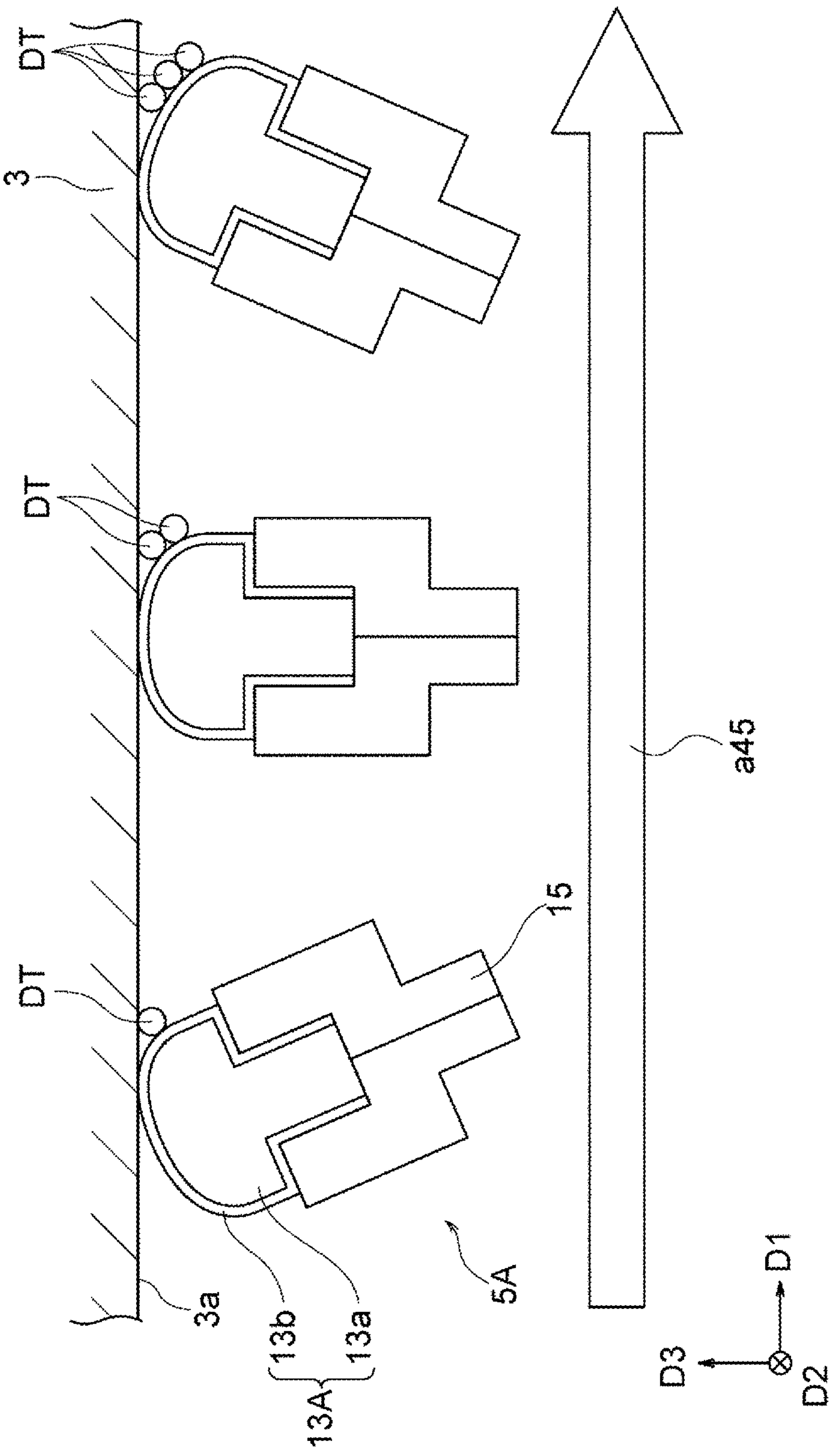
FIG. 11 is a schematic view illustrating an alternative embodiment of a wiping operation.

FIG. 11 is a schematic view illustrating an alternative embodiment of the wiping operation.

FIG. 11 illustrates a situation in which the cartridge 5 (more specifically, the first cartridge 5A) wipes the head 3 while moving toward the +D1 side as indicated by the arrow a45. At this time, the angle of the cartridge 5 with respect to the nozzle surface 3*a* may be changed to shift a portion of the wipe member 13A coming into contact with the nozzle surface 3*a*.

In this case, a region in a surface of the wipe member 13A, the region coming into contact with the nozzle surface 3*a*, shifts with a change in the angle of the cartridge 5. That is, as understood from the positions of schematically illustrated soil DT adhering to the wipe member 13A, a clean region of the wipe member 13A can be used without waste.

Consequently, the nozzle surface 3*a* can be effectively cleaned. In another point of view, frequency of replacement of the cartridge 5 can be reduced.

A configuration that realizes the aforementioned operation can be various. For example, the aforementioned operation can be realized in the first embodiment by synchronizing a rotation of the arm body 29 around the rotation axis R1 and a movement of the hold portion 27 in the direction indicated by the arrow a4. For example, the aforementioned operation can be realized in any of the first to third embodiments by adding a joint that rotates the hold portion 27 around a rotation axis parallel to the D2 direction with respect to the arm body 29. The aforementioned added joint may be disposed on the side of the arm body 29 and may be disposed on the side of the hold portion 27 with respect to a mechanism that realizes a movement in the direction indicated by the arrow a4.

Specific Example of Printer

As previously described, the device 1 may be a printer. One example of a configuration of the device body 7 (part of the device 1 other than the wiper 9) when the device 1 is a printer is presented below.

Figure 12:
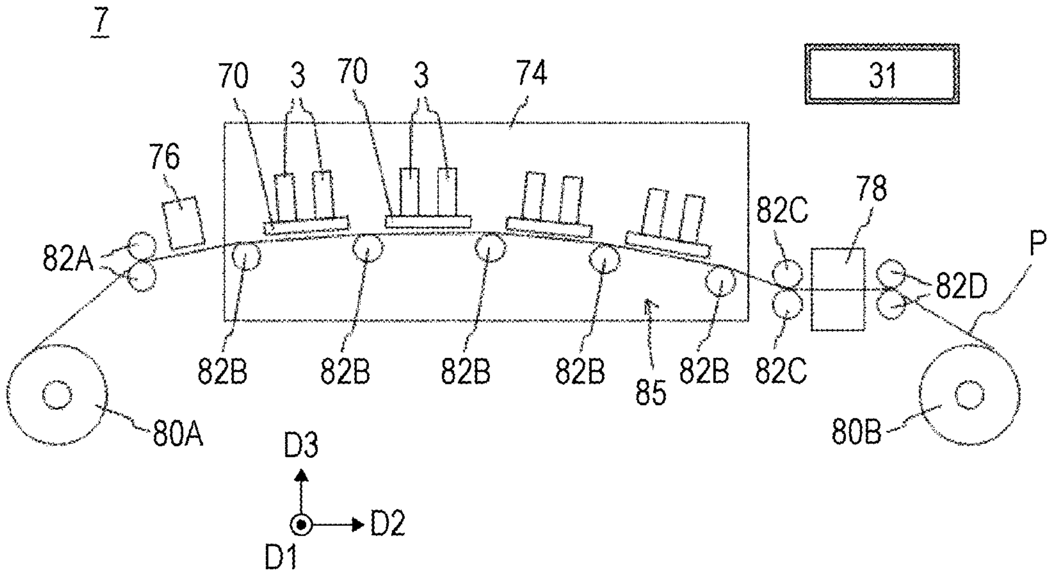
FIG. 12 is a side view illustrating a specific example of the liquid ejection device according to an embodiment.
Figure 13:
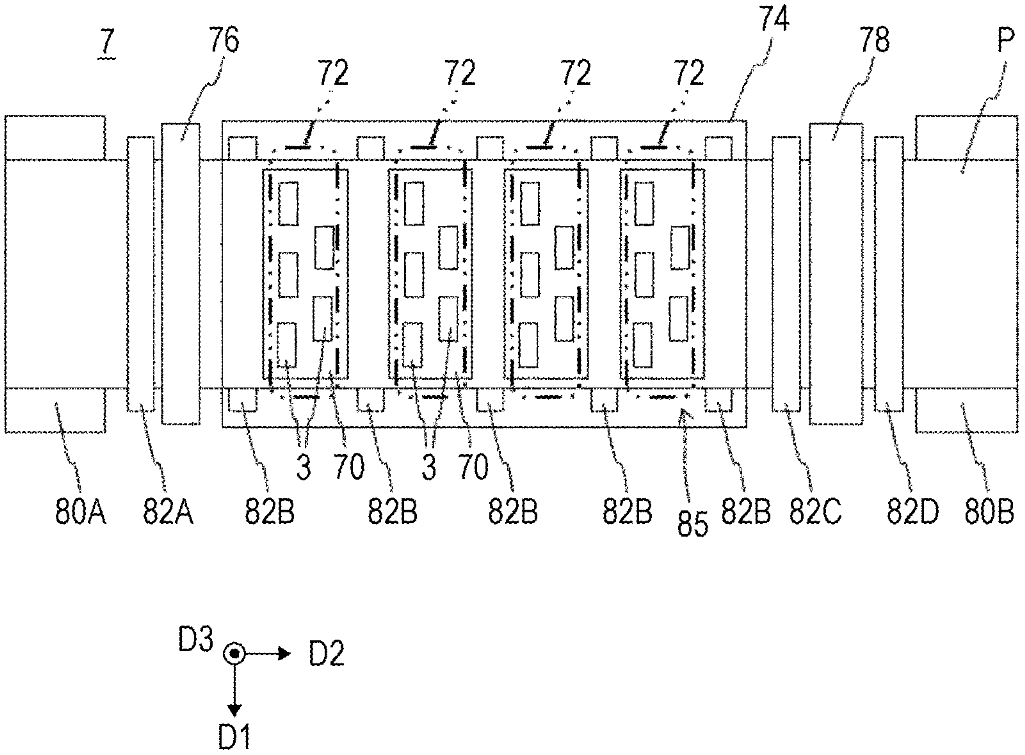
FIG. 13 is a plan view of the liquid ejection device in FIG. 12.

FIG. 12 is a schematic side view of the device body 7. FIG. 13 is a schematic plan view of the device body 7.

FIG. 12 and FIG. 13 each include an orthogonal coordinate system D1-D2-D3 defined for the head 3. As understood from description below, the device body 7 includes multiple heads 3. Directions of the multiple heads 3 slightly differ from each other. Therefore, the orthogonal coordinate system D1-D2-D3 is included without consideration of exactness.

The device body 7 is a line printer in which, while a print sheet P is transported in the D2 direction (a short direction of the heads 3), the heads 3 whose movement is restricted eject ink droplets and performs printing with respect to the print sheet P. More specifically, the device body 7 transports the print sheet P from a sheet feeder roller 80A to a collection roller 80B, thereby moving the print sheet P relatively to the heads 3. Note that the sheet feeder roller 80A, the collection roller 80B, and later-described various types of rollers are included in a transport portion 85 that moves the print sheet P and the heads 3 relatively. The controller 31 controls the heads 3 on the basis of print data and/or the like, which is data of images, characters, and/or the like, to eject a liquid toward the print sheet P to cause droplets to land on the print sheet P and performs recording such as printing with respect to the print sheet P.

The device body 7 includes four tabular head mount frames 70 (hereinafter may be simply referred to as the frames) to be substantially parallel to the print sheet P. Each of the frames 70 includes five holes (not illustrated), and five heads 3 are mounted on a portion of respective one of the holes. The five heads 3 mounted on one frame 70 are included in one head group 72. The device body 7 includes four head groups 72. Twenty heads 3 in total are mounted on the device body 7.

The nozzle surface 3*a* (a surface on the −D3 side) of each of the heads 3 mounted on the frames 70 faces the print sheet P. A distance between each of the heads 3 and the print sheet P is, for example, about 0.5 to 20 mm.

The twenty heads 3 may be directly connected to the controller 31 or connected to the controller 31 via a distributer that distributes print data. For example, the controller 31 may send print data to one distributer, and the one distributer may distribute the print data to the twenty heads 3. For example, the controller 31 may distribute print data to four distributers corresponding to a respective one of the four head groups 72, and each of the distributers may distribute the print data to the five heads 3 in a corresponding one of the head groups 72.

In one head group 72, three heads 3 are arranged in a direction intersecting (for example, a direction substantially orthogonal to) a transport direction of the print sheet P. The other two heads 3 are arranged one each between the three heads to be shifted from each other in the transport direction. In another expression, the heads 3 are disposed in a zigzag form in one head group 72. The heads 3 are disposed such that ranges in which the heads can perform printing are continuous in a width direction of the print sheet P, that is, a direction intersecting the transport direction of the print sheet P or such that ends of the ranges overlap each other. The heads 3 can perform printing without a gap in the width direction of the print sheet P.

The four head groups 72 are disposed in the transport direction of the print sheet P. A liquid (for example, an ink) is supplied to each of the heads 3 from a liquid supply tank (not illustrated). An ink of the same color is supplied to each of the heads 3 belonging to one head group 72, and printing with inks of four colors can be performed with the four head groups 72. The colors of the inks ejected from the head groups 72 are, for example, magenta (M), yellow (Y), cyan (C), and black (K). Such inks are landed on the print sheet P to print a color image.

The number of the heads 3 mounted on the device body 7 may be one when printing of a range printable with one head 3 is performed with a single color. The number of the heads 3 included in each head group 72 and/or the number of the head groups 72 can be changed, as appropriate, in accordance with an object to be printed and/or conditions of printing. For example, the number of the head groups 72 may be increased to perform printing with more multiple colors. When a plurality of the head groups 72 that perform printing with the same color are disposed and printing is performed alternately in the transport direction, the speed of transport can be increased even when the heads 3 having the same capacity are used. Consequently, the area of printing per hour can be increased. A plurality of the head groups 72 that perform printing with the same color may be prepared and disposed to be displaced from each other in a direction intersecting the transport direction, and resolution in the width direction of the print sheet P may be increased.

Other than printing with a colored ink, a liquid such as a coating agent may be printed uniformly or in a pattern by the head 3 to perform surface treatment of the print sheet P. When, for example, a recording medium into which liquid is not easily absorbed is used, a coating agent that forms a liquid reception layer to cause the liquid to be fixed easily can be used. When a recording medium into which liquid is easily absorbed is used, a coating agent that forms a liquid-penetration suppression layer to suppress excessive spreading of the liquid and suppress mixing of the liquid with another liquid landed next thereto can be used. Other than being printed by the head 3, the coating agent may be applied uniformly by an application machine 76 controlled by the controller 31.

The device body 7 performs printing with respect to the print sheet P, which is a recording medium. The print sheet P is in a state of being wound around a sheet feeder roller 80A. The print sheet P that is delivered from the sheet feeder roller 80A passes under the heads 3 mounted on the frames 70, then passes between two transport rollers 82C, and are eventually collected by the collection roller 80B. In printing, the transport rollers 82C rotate to transport the print sheet P at a fixed speed, and the head 3 performs printing with respect to the print sheet P.

Next, details of the device body 7 will be described in order of transport of the print sheet P. The print sheet P delivered from the sheet feeder roller 80A passes under the application machine 76 after passing between two guide rollers 82A. The application machine 76 applies the above-described coating agent to the print sheet P.

The print sheet P next enters a head chamber 74 in which the frames 70 on which the heads 3 are mounted are housed. Although partially connected at, for example, an entrance portion for the print sheet P to the outside, the head chamber 74 is generally a space insulated from the outside. In the head chamber 74, control factors such as temperature, humidity, and atmospheric pressure are controlled, as necessary, by the controller 31 and/or the like. Compared with the outside where the device body 7 is installed, an influence of disturbance can be reduced in the head chamber 74. The variation range of the above-described control factors can be narrower than those in the outside.

Five guide rollers 82B are disposed in the head chamber 74. The print sheet Pis transported on or above the guide rollers 82B. The five guide rollers 82B are disposed in a form protruding at a central portion toward the direction where the frames 70 are disposed when viewed from a side. Consequently, the print sheet P transported on the five guide rollers 82B has an arc shape when viewed from the side. A tensile force is applied to the print sheet P to stretch the print sheet P between the guide rollers 82B into a flat shape. The frames 70 are disposed one each between two of the guide rollers 82B. The frames 70 are set at angles that are slightly different from each other to be parallel to the print sheet P transported under the frames 70.

The print sheet P that has exited from the head chamber 74 to the outside passes between the two transport rollers 82C, passes the inside of a dryer 78, passes between two guide rollers 82D, and are collected by the collection roller 80B. The speed of transport of the print sheet P is, for example, 100 m/minute. Each of the rollers may be controlled by the controller 31 or operated manually by a person.

Drying by the dryer 78 suppresses adhesion between layers of the print sheet P wound in an overlapping manner around the collection roller 80B and/or smudging of undried liquid. To perform printing at a high speed, drying is also required to be performed at a high speed. To perform drying at a high speed, multiple drying methods may be used sequentially or multiple drying methods may be used in combination for drying in the dryer 78. Examples of the drying methods used in such drying are blowing of warm air, irradiation with infrared light, contact with a heated roller, and the like. When irradiation with infrared light is performed, infrared light in a specific frequency range may be applied to increase the speed of drying while reducing damage to the print sheet P. When the print sheet P is brought into contact with a heated roller, the print sheet P may be transported along a cylindrical surface of the roller to increase the time for heat to be transmitted to the print sheet P. The range of the transport along the cylindrical surface of the roller is preferably ¼ or more of the circumference of the cylindrical surface of the roller and is more preferably ½ or more of the circumference of the cylindrical surface of the roller. When printing with a UV curable ink or the like is performed, a UV-irradiation light source may be disposed instead of the dryer 78 or in addition to the dryer 78. The UV-irradiation light source may be disposed between the frames 70.

The recording medium is not limited to the print sheet P and may be a rolled fabric or the like. Instead of directly transporting the print sheet P, the device body 7 may transport a transport belt and transport the recording medium placed on the transport belt. In such transport, a sheet of paper, a cut fabric, a wood material, a tile, or the like can be used as a recording medium. The heads 3 may eject a liquid that contains electrically conductive particles and print a wiring pattern or the like of an electronic device. The heads 3 may eject a predetermined amount of a liquid chemical agent or a liquid that contains a chemical agent toward a reaction container or the like and cause a reaction or the like to prepare a chemical.

A position sensor, a speed sensor, and/or a temperature sensor may be attached to the device body 7, and the controller 31 may control each portion of the device body 7 in accordance with a state of each portion of the device body 7 known from information from each of the sensors. When, for example, ejection characteristics (for example, the ejection amount and/or the ejection speed) of an ejected liquid are affected by the temperature of the heads 3, the temperature of the liquid in a liquid supply tank that supplies the liquid to the heads 3, a pressure applied by the liquid in the liquid supply tank to the heads 3, and/or the like, a drive signal that causes the liquid to be ejected may be changed in accordance with information from these sensors.

(Example of Configuration of Wiping Multiple Heads)

FIG. 14 is a schematic view illustrating an example of a configuration of a wiper 409 used in the device body 7. In FIG. 14, the nozzle surfaces 3*a* of the heads 3 are also illustrated by dotted lines.

For example, each of the heads 3 in the wiper 409 may include the configuration presented in the first embodiment. That is, the wiper 409 may include multiple arms 21, the number of the multiple arms 21 being the same as the number of the multiple heads 3. Consequently, even when the multiple heads 3 are included, wiping, replacement for the wiping, and the like can be performed similarly to the first embodiment. Although the first embodiment is presented as an example, the same applies to the second embodiment and the third embodiment.

Note that some of multiple members corresponding to the multiple heads 3 may be coupled to each other and may be included in one member. In the first embodiment, for example, multiple arm bodies 29 may be rotatably supported by one base body (not illustrated), multiple standby portions 23 may be supported by one bed 43, and multiple standby portions 23 may be coupled to each other (may be driven by one drive source 37). In the second and third embodiments, multiple arm bodies 29 may be collected together into one member, the base portions 27*a* of multiple hold portions 27 may be collected together into one member (may be driven by one drive source 35), and multiple pairs of the fingers 27*b* may be driven by one drive source 27*c*. In the second embodiment, multiple arms 21 may be supported by one bed 247, and multiple arm bodies 29 may be collected together into one member (may be driven by one drive source 233). In the third embodiment, multiple frames 349 may be collected together into one member (may be driven by one drive source 333).

Other than the illustrated configuration, the configuration that wipes multiple heads 3 can be various. For example, a less number of wipers 9, presented in the first embodiment, than the number of the multiple heads 3 may be included. The heads 3 and the wiper 9 may relatively move to wipe the multiple heads 3 sequentially. For example, five heads 3 may be wiped with one wiper 9 by moving the one wiper 9 in the D1 direction and the D2 direction sequentially. For example, two wipers 9 may be disposed at positions that differ from each other in the D2 direction. One of the wipers 9 may serve for the three heads on the –D2 side while the other one of the wipers 9 may serve for the two heads on the +D2 side. Note that, in these examples, an operation of sequentially wiping the multiple heads 3 arranged in the D1 direction may be realized by a movement of the arm 21 with respect to the bed 43 in the D1 direction. For example, the cartridge 5 may have a size to extend over two or more heads 3 in the D2 direction to wipe multiple heads 3. Although the first embodiment is presented as an example, the same applies to the second and third embodiments.

Note that the technologies according to the present disclosure are not limited to the embodiments described above and may be embodied in various forms.

For example, the applicator may be not positioned on a movement path of a cartridge from the standby portion to a position at which the cartridge comes into contact with a nozzle surface. For example, the applicator may supply the cleaning liquid to the nozzle surface. Cartridges may be arranged in two or more rows at the standby portion.

REFERENCE SIGNS

1 liquid ejection device
3 liquid ejection head
3*a* nozzle surface
23 standby portion
27 hold portion
5 wiping cartridge
45 operation portion

The invention claimed is:

1. A liquid ejection device comprising:

a liquid ejection head including a nozzle surface;

a standby portion that supports at least one wiping cartridge;

a hold portion that holds the at least one wiping cartridge; and an operation portion that includes at least one of a first drive source that generates a driving force to move the hold portion or a second drive source that generates a driving force to move the standby portion, and moves the hold portion relatively to the standby portion and the liquid ejection head from a position at which the hold portion holds the at least one wiping cartridge that is not held by the hold portion and that is supported by the standby portion to a position at which the at least one wiping cartridge held by the hold portion comes into contact with the nozzle surface;

wherein the at least one wiping cartridge comprises a grip portion that is to be gripped by the hold portion, the grip portion being closer than a portion of the at least one wiping cartridge coming into contact with the nozzle surface to a rear end portion of the at least one wiping cartridge, and wherein the grip portion has a width in a predetermined direction orthogonal to a direction from a distal end portion of the at least one wiping cartridge toward the rear end portion of the at least one wiping cartridge, the width being smaller than a width of at least another portion of the at least one wiping cartridge in the predetermined direction.

2. The liquid ejection device according to claim 1, wherein the standby portion supports a first number of the at least one wiping cartridge simultaneously, the first number being two or more, and wherein the hold portion picks up, from the first number of the at least one wiping cartridge supported by the standby portion, one or more of the at least one wiping cartridge, a number of the one or more of the at least one wiping cartridge being less than the first number.

3. The liquid ejection device according to claim 2, wherein the at least one wiping cartridge that has wiped the nozzle surface is returned to the standby portion.

4. The liquid ejection device according to claim 3, wherein the at least one wiping cartridge that has wiped the nozzle surface is returned to an original position of the at least one wiping cartridge at the standby portion.

5. The liquid ejection device according to any claim 2, wherein the first number of the at least one wiping cartridge each comprise a wipe member that comes into contact with the nozzle surface, and wherein the first number of the at least one wiping cartridge include two or more types of the at least one wiping cartridge that differ from each other in terms of a material of the wipe member.

6. A liquid ejection device, comprising:

a liquid ejection head including a nozzle surface;

a standby portion that supports at least one wiping cartridge;

a hold portion that holds the at least one wiping cartridge; and an operation portion that includes at least one of a first drive source that generates a driving force to move the hold portion or a second drive source that generates a driving force to move the standby portion, and moves the hold portion relatively to the standby portion and the liquid ejection head from a position at which the hold portion holds the at least one wiping cartridge that is not held by the hold portion and that is supported by the standby portion to a position at which the at least one wiping cartridge held by the hold portion comes into contact with the nozzle surface;

wherein the standby portion supports a first number of the at least one wiping cartridge simultaneously, the first number being two or more, wherein the hold portion picks up, from the first number of the at least one wiping cartridge supported by the standby portion, one or more of the at least one wiping cartridge, a number of the one or more of the at least one wiping cartridge being less than the first number, and wherein the standby portion comprises a container that houses at least a lower portion of each of the first number of the at least one wiping cartridge, and a positioning portion that positions the first number of the at least one wiping cartridge to be above and away from a bottom surface of the container.

7. A liquid ejection device, comprising:

a liquid ejection head including a nozzle surface;

a standby portion that supports at least one wiping cartridge;

a hold portion that holds the at least one wiping cartridge; and an operation portion that includes at least one of a first drive source that generates a driving force to move the hold portion or a second drive source that generates a driving force to move the standby portion, and moves the hold portion relatively to the standby portion and the liquid ejection head from a position at which the hold portion holds the at least one wiping cartridge that is not held by the hold portion and that is supported by the standby portion to a position at which the at least one wiping cartridge held by the hold portion comes into contact with the nozzle surface;

wherein the standby portion supports a first number of the at least one wiping cartridge simultaneously, the first number being two or more, wherein the hold portion picks up, from the first number of the at least one wiping cartridge supported by the standby portion, one or more of the at least one wiping cartridge, a number of the one or more of the at least one wiping cartridge being less than the first number, and wherein the standby portion comprises a container that houses at least a lower portion of each of the first number of the at least one wiping cartridge, and multiple partitions partitioning an inside of the container, the multiple partitions forming multiple spaces in each of which a corresponding one of the first number of the at least one wiping cartridge is individually housed.

8. The liquid ejection device according to claim 2, wherein the one or more of the at least one wiping cartridge to be picked up by the hold portion are selected based on information relating to an amount of a liquid adhering to the nozzle surface from the first number of the at least one wiping cartridge.

9. The liquid ejection device according to claim 1, further comprising:

an applicator that applies a cleaning liquid to the at least one wiping cartridge, the applicator being disposed at a midway of a path of a relative movement of the at least one wiping cartridge from the standby portion to the position at which the at least one wiping cartridge comes into contact with the nozzle surface.

10. The liquid ejection device according to claim 1, further comprising:

an applicator that applies a cleaning liquid to the at least one wiping cartridge, the applicator being disposed between the position at which the hold portion holds the at least one wiping cartridge supported by the standby portion and the position at which the at least one wiping cartridge held by the hold portion comes into contact with the nozzle surface.

11. The liquid ejection device according to claim 1, further comprising:

an attachment-detachment portion that the standby portion is attached to and detached from.

12. The liquid ejection device according to claim 1, wherein a relative movement of the at least one wiping cartridge from the standby portion to the position at which the at least one wiping cartridge comes into contact with the nozzle surface is performed in a plane parallel to a longitudinal direction of the liquid ejection head.

13. The liquid ejection device according to claim 1, wherein an angle of the at least one wiping cartridge with respect to the nozzle surface is changed to shift a portion of the at least one wiping cartridge coming into contact with the nozzle surface during a one-direction movement of the at least one wiping cartridge being in contact with the nozzle surface.

14. The liquid ejection device according to claim 1, wherein the nozzle surface faces one side in a first direction, wherein the operation portion comprises a support portion positioned on the one side in the first direction with respect to the liquid ejection head, wherein the support portion is rotatable around a rotation axis orthogonal to the first direction, wherein the hold portion is supported by the support portion to be movable in a direction orthogonal to the rotation axis, and wherein the standby portion is positioned at any one of orientations around the rotation axis with respect to the support portion.

15. The liquid ejection device according to claim 1, wherein the nozzle surface faces one side in a first direction, wherein the standby portion is positioned in a second direction with respect to the liquid ejection head, the second direction being orthogonal to the first direction, wherein the operation portion comprises a support portion positioned on the one side in the first direction with respect to the liquid ejection head and the standby portion, wherein the support portion is movable in the second direction, and wherein the hold portion is supported by the support portion to be movable in the first direction.

16. The liquid ejection device according to claim 1, wherein the nozzle surface faces one side in a first direction, wherein the standby portion is positioned in a second direction with respect to the liquid ejection head, the second direction being orthogonal to the first direction, wherein the operation portion comprises a movement portion supporting the liquid ejection head and the standby portion, the movement portion being movable in the second direction, and a support portion positioned on the one side in the first direction with respect to the liquid ejection head and the standby portion, and wherein the hold portion is supported by the support portion to be movable in the first direction.

* * * * *